(12) United States Patent
Cressy

(10) Patent No.: US 10,486,575 B2
(45) Date of Patent: *Nov. 26, 2019

(54) ADJUSTABLE AUTOMOBILE TRASH CAN

(71) Applicant: Eddie Lawrence Cressy, Pearblossom, CA (US)

(72) Inventor: Eddie Lawrence Cressy, Pearblossom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,419

(22) Filed: Jul. 31, 2017

(65) Prior Publication Data

US 2018/0186267 A1 Jul. 5, 2018

Related U.S. Application Data

(63) Continuation-in-part of application No. 14/863,484, filed on Sep. 24, 2015, now Pat. No. 9,762,544.

(51) Int. Cl.
| | |
|---|---|
| *B60N 3/08* | (2006.01) |
| *B65F 1/08* | (2006.01) |
| *B60R 11/00* | (2006.01) |
| *B65F 1/14* | (2006.01) |
| *B65F 1/16* | (2006.01) |

(52) U.S. Cl.
CPC ........ *B60N 3/08* (2013.01); *B60R 2011/0059* (2013.01); *B65F 1/08* (2013.01); *B65F 1/1436* (2013.01); *B65F 1/16* (2013.01)

(58) Field of Classification Search
CPC ... B60N 3/08; B60R 7/043; B60R 2011/0012; B60R 2011/0029; B60R 7/04; B65F 1/067; B65F 1/04; B65F 1/01; B65F 1/1623; B65F 1/06; B65F 2200/1066; Y10S 224/928; B63B 29/00
USPC .............................. 224/275, 928, 493, 42.39
See application file for complete search history.

(56) References Cited

U.S. PATENT DOCUMENTS

| | | | | |
|---|---|---|---|---|
| 3,526,314 A | * | 9/1970 | Trammell, Jr. ......... | B60N 3/08 220/481 |
| 3,674,191 A | * | 7/1972 | Goings .................... | B60N 3/08 224/277 |
| 5,871,037 A | * | 2/1999 | Feldt ....................... | B65B 39/02 141/314 |
| 8,910,821 B1 | * | 12/2014 | Stravitz .................... | B65F 1/06 220/495.04 |
| 2005/0224568 A1 | * | 10/2005 | Waugh ..................... | B60N 3/08 232/43.5 |

(Continued)

*Primary Examiner* — Scott T McNurlen
(74) *Attorney, Agent, or Firm* — Christopher Persaud

(57) ABSTRACT

This invention includes portable trash receptacles that can be used by vehicle occupants to dispose of garbage when in an automobile, truck, boat, airplane, or other vehicle. Embodiments of the invention can be used to store other things, such as toys, papers, or snacks. Embodiments of the invention are designed to take up unused space in the vehicle, and also the embodiments are designed to be adjustable in size, to fit any vehicle. Some embodiments of the invention also include a roll-top lid, and other embodiments are made of clear material, so that the user can see their contents. Still other embodiments include side compartments, to make them multifunctional. Embodiments contain modifications such as liners, making them easier to clean. The invention also includes a method for vehicle occupants to dispose of trash.

22 Claims, 24 Drawing Sheets

(56) References Cited

U.S. PATENT DOCUMENTS

2008/0173648 A1* 7/2008 Escobar ................ B65F 1/06
          220/495.11
2009/0230131 A1* 9/2009 McDuffie ............... B65F 1/06
          220/495.06

* cited by examiner

ADJUSTABLE AUTOMOBILE TRASH CAN

This patent application claims priority to application Ser. No. 14/863,434 (since allowed), which claimed priority to U.S. Provisional Application 62/053,925, both of which have Eddie Lawrence Cressy as their inventor, and both of which are hereby incorporated by reference in their entirety. This present patent application also claims priority to U.S. Provisional Application 62/481,661, and which has Eddie Lawrence Cressy as its inventor, and is hereby incorporated by reference in its entirety.

FIELD OF THE INVENTION

This invention relates primarily to the fields of waste disposal and storage for occupants of motor vehicles, boats, airplanes, trucks, and other vehicles. Embodiments of the invention also have several other capabilities that users may desire. Embodiments of the invention can be used to store garbage, and also to store other items. For example, dedicated embodiments of the invention can be used to store toys or snacks for long trips.

DESCRIPTION OF THE RELATED ART

This invention relates generally to the field of waste disposal for occupants of automobiles and other vehicles. Embodiments of the invention can also be used for other purposes. A brief discussion of the field of the invention will follow.

Though the apparatus which is part of the invention will be referred to as an "automobile trash can" throughout this application, it is important to note that this apparatus can be used as a trash can in other vehicles, such as trucks, airplanes, boats, and buses.

Littering is a serious problem in the United States, as is littering on roadsides. Many states have imposed fines for littering on the side of a road. California, for example, has imposed a $1000 fine for littering by the side of a state highway.

Many automobile occupants will find that they need to dispose of an article of trash, such as a used soda can, when inside an automobile. In such cases, the occupant of the automobile has no good method of disposing of the trash while driving, or storing it to dispose of later. The occupant can place the article of trash in some of the compartments within the automobile, but that creates the possibility that these compartments will be soiled, or that the automobile's electronics will be damaged by something spilling out of the trash article. There is a need for a trash container for automobiles that keeps the trash separate from the components of the automobile itself, so that when the driver stops and finally disposes of the trash, the components of the automobile will not be soiled. This trash container should also preferably be capable of being used with existing automobiles, with a minimum of installation effort. The trash container should also be designed so that the trash can be removed from the automobile easily when the automobile stops.

Drivers and occupants of trucks, sports utility vehicles, boats, and other motor vehicles suffer from similar problems, in this regard, to those of automobile occupants.

There is a long-felt need for a portable, lightweight trash can that can be stored and used within an automobile or other motor vehicle, while driving, and which can be opened easily by drivers and passengers, and which does not take up space in a manner that interferes with the drivers and the passengers.

This trash can should ideally be easy to clean, and should have safety features included to prevent it from accidentally dislodging and injuring a passenger.

In addition, airplane passengers sometimes wind up with large amounts of trash such as wrappers, soda cans, and cups, especially on long flights. An airplane passenger may also be forced to remain in his or her seat because such trash remains on the tray table in front of the passenger, so the passenger cannot stow the tray table and get up. There is also a need for a portable, lightweight, trash receptacle, which can be used by airplane passengers to store trash, and which can be easily cleaned after a flight. This trash receptacle should also include safety features, and should not take up space in a manner that interferes with the passengers.

Embodiments of the present invention can fulfill all these goals.

Variations of the present invention fulfill other needs. For example, one version of the invention includes a partially or fully transparent outer container. This way, a user can more easily determine what is inside the outer container, and whether the outer container needs to be cleaned or the liner needs to be replaced. This can be highly useful, when distributing or examining a large number of automobile trash cans at the same time. Several other versions include a "shell" that allows a user to set the height of the outer container relative to the floor of the automobile. This means that one automobile trash can may be used with a larger variety of vehicles. Another version of the automobile trash can include a "trap door" in its lid, so that a user can put small things into the automobile trash can more easily. If a user needs to put a larger object into the automobile trash can, the user can flip up the whole lid. Another version includes both a shell, and a canvas outer container, thus allowing the user to set the height of the outer container at the level comfortable for the user.

Presently, most seats on aircraft have a "pocket" on the back of the seat. The pocket usually contains magazines and a "vomit bag" in case the passenger in back of the seat becomes airsick. If the passenger does become airsick, he can use the vomit bag, but then has no place to put it. He can, of course, put it in the seat pocket, but this potentially soils the pocket and increases the cost of cleaning the pocket later. The chair is attached to the pocket, and may also be soiled and need to be cleaned later. A need exists for a means of holding the vomit bag, after it is used, without soiling the pocket and seat.

In addition, people, including children, sometimes become bored on airline flights. A need exists for a means for an airline to include several toys or amusement items in easy reach of a passenger, so that the passenger does not become bored, especially if the passenger is a child.

Embodiments of the present invention satisfy all of these needs. Some embodiments of the present invention can be used to fulfill these needs without reducing the amount of room that a passenger in the back of an airline seat has.

Embodiments of the present invention can also be used in conjunction with seats on trains, boats, including tour boats, and buses, and other vehicles. With reference to all of these vehicles, and to airplanes, the vehicle owner can place a version of the present invention with its strap around a seat, to allow the items inside the seat to be accessible to the person sitting in the seat or the person sitting behind the seat.

Embodiments of the present invention can also be used for waste disposal in conjunction with seats on trains, boats, including tour boats and ferries, and buses, and other vehicles, in much the same way that they can be used for waste disposal on airplanes.

Embodiments of the present invention can be taken out of one vehicle, and adjusted to function inside another vehicle.

RELEVANT PRIOR ART

Cressy invented a group of automobile trash cans, which can also be used for vehicles such as (but not limited to) boats, trucks, buses, and airplanes, and can also be used to store things besides trash, and which were described in application Ser. No. 14/863,434. The inventions described in application Ser. No. 14/863,434 are effective for their intended purposes. Cressy has since made several improvements over the inventions discussed in application Ser. No. 14/863,434. These improvements are part of the present invention, and are discussed in this present application. Some of the improvements were also discussed in Application 62/481,661.

In the invention of application Ser. No. 14/863,434, if the user desires, the user can control the height of the automobile trash can relative to the floor of the vehicle by picking the rows of slots to thread the strap through. The present invention includes several features that increase the user's ability to control the height of the automobile trash can relative to the floor of the vehicle.

The multiple rows of slots mean that the user can adapt the automobile trash can to the vehicle by threading the strap through those slots that will allow the user to also fit the strap in the most convenient way around the below-seat components.

The present invention preserves this design, and also includes other embodiments that do not include slots, but achieve the same effect.

Several of the embodiments of the invention disclosed in the present application have the ability to be "resized", which increases their ability to fit the needs of different users, or to fit the needs of the same user in different vehicles.

The present invention can be manufactured cheaply, and can be installed quickly and easily in an automobile or truck where the invention had not previously been installed. The invention is also small and light enough that a user might install several examples of the invention in different parts of the passenger compartment of the automobile.

Other inventions have been patented, that somewhat relate to the same field as the present invention, but these other inventions operate on different principles from the present invention, and also do not possess the combination of attributes of the present invention.

Krikorian et. al.'s Application 20160176356 discloses a holding apparatus for electronics that vaguely resembles a shelf that can be folded out. This has a completely different design from the present invention. The present invention can also be used to store many things besides electronics.

Sharp et. al's Application 20160159484 discloses a mounting system with has rods and a couple components mounting rods to the floor. The present invention, however, holds trash after trash is placed inside it, and Sharp's invention is designed to achieve nothing similar.

U.S. Pat. No. 9,580,031 by Kalis describes a foam seat divider with removable pockets on the side. This foam seat divider has a completely different function and structure from the present invention.

U.S. Pat. No. 9,517,810 by Fukumoto et. Al. describes a glove compartment that is operated by a hinge mechanism. This is very different from the present invention, that does not need any hinge mechanisms and is designed to have a different shape, with different components, from Fukumoto's invention.

U.S. Pat. No. 9,493,302 by Rousso et. al describes a circular waste disposal receptacle that can be used to hold trash and is operated by a foot pedal. This is different in operating principle from the present invention, and Rousso's invention does not include the configuration of straps and either slots or tabs that is possessed by the present invention.

U.S. Pat. No. 8,651,292 by Sunderland et. al. describes an open shelf that can be used to hold a trash can. This is different from the present invention, that is an enclosed trash can, with internal components, as opposed to a shelf that can be used to hold a trash can.

U.S. Pat. No. 8,596,714 by Whitman discloses a vehicle seat storage compartment that is placed below the seat, and must be built into an automobile seat. The present invention differs substantially from Whitman's invention because the present invention can be installed in any vehicle, including vehicles such as trucks, boats, and airplanes.

U.S. Pat. No. 8,376,200 by Kim includes a receptacle that is clipped to the part of an automobile and holds trash bags. However, several embodiments of the present invention include solid liners and solid lids. Many embodiments of the present invention include lids that contain additional trap-doors in the lid. The present invention also includes a configuration of straps, and other components designed to hold the straps, that is not present in Kim's invention.

Other inventions of the prior art are described in the specification of application Ser. No. 14/863,434. The present invention differs from these other inventions, as well.

SUMMARY OF THE INVENTION

Term Numbers

The following numbers will be used to refer to different components of the invention, in the specification, claims, and drawings. (1) Outer container. (2) Regular Liner. (3) Strap. (4) Slot (5) Lid. (6) Back panel. (7) Spring. (8) Flexible outer container (9) Clip. (10) Feet. (11) Buckle. (12) Screws. (14) Light. (17) Elastic cord. (20) Holder ring. (21) Sizing hole. (22) Shell. (24) Tilting shelf. (25) Liner ledge. (26) Roll-top lid. (28) Sizing knob. (30) Tilting shelf opening button. (31) Runner. (32) Trap door. (34) Adjustable liner. Knob hole (35). Dispenser (38). Tab (45).

Many of the term numbers listed in this patent application are the same as the term numbers listed in application Ser. No. 14/863,434, so that the user can easily follow the relationships of the components. Most components that have term number in application Ser. No. 14/863,434 will have the same term numbers here. The present invention also includes other, additional components, that are not part of the invention of application Ser. No. 14/863,434. Some of these additional components are listed in Application 62/481,661.

The apparatus of the present invention can also be used to store other things besides trash. For example, the apparatus can be used to store toys or papers for students on a school bus. A bus or other vehicle may include more than one example of the apparatus; A bus or other vehicle may include one or more examples of the apparatus for each seat, or for each passenger, so that each passenger has access to two examples of the invention. A bus or other vehicle may also include more than one type of the invention, for example, an automobile may include examples of the first embodiment, and the second embodiment, of the invention.

Most automobiles and other motor vehicles have various components below the driver's seat and front passenger's seat, and above the floor. These components may include runners or mechanisms for moving the seat backwards or forwards. These components shall collectively be referred to as the "below-seat components" for purposes of this application. The exact components below the driver's seat or passenger's seat of a vehicle may vary, but this variation is of no importance to the invention. The most important point about the below-seat components, for purposes of this application, is that the strap (3) of the invention can be used to attach the outer container (1) to them, or other components can secure the outer container to the below-seat components, thus securing the automobile trash can in place.

The cushion, part of a seat, that a person sits on while using the seat shall be called the lower cushion, and the components that a person may rest her back or head against, while using the seat, shall be called the upper seat components.

The height of several different versions of the present invention can be adjusted, to be used in any vehicle.

Variations of the invention of application Ser. No. 14/863,434 include embodiments where the outer container (1) has a rounded, raised lip next to the lid (5). This helps users to grip the lid more easily, because the user can reach behind the lip with his or her finger to grip the lid. Other embodiments have a rounded, lowered lid, which also helps users to grip the lid more easily, because the user can reach behind the lip with his or her finger to grip the lid. Such variations are explicitly part of the present invention; All embodiments of the present invention can include either a raised lip or lowered lip next to the lid, and the raised or lowered lip may or may not be rounded.

The embodiments of the invention discussed herein can all be attached to the below-seat components of an automobile using the strap(s), but they can all also be attached to other parts of the inside of an automobile. For example, they can be strapped to the upper cushion or the lower cushion. They can additionally be strapped to the back of a seat on an airplane, bus, or train. They can also be strapped to, or draped over, the back of a seat of an automobile. Some versions of the invention could also theoretically be attached to wheelchairs.

Fundamental Components of the Invention

The following is based on some of the information about the invention discussed in application Ser. No. 14/863,434, and is included here to help the user understand the embodiments of the invention that are discussed in this application. For a more complete explanation of the basic versions of the outer container, the regular liner, and the strap, the lid, and back panel, spring, flexible outer container, clip, feet, buckle, screws, light, and elastic cord, please consult Application 14863434. Nothing herein detracts from the scope of the invention of application Ser. No. 14/863,434.

Most embodiments of the invention involve an outer container (1), which is solid and can be attached to the structures in an automobile or other motor vehicle that are below either the driver's seat, or below the front passenger's seat. Versions of the outer container (1) can also be attached to other components in the motor vehicle, including the lower cushion and upper cushion. The outer container (1) has a lid, and inside the outer container is a liner. The invention also includes a means of attachment, by which the outer container (1) is attached to the below-seat structure or another component of the vehicle. Multiple structures and methods that fulfill the function of the means of attachment are discussed below. In some embodiments of the outer container, the corners between the back and both the top and the bottom, the front and both the top and the bottom, the bottom and both the left and right sides, and the top and both the left and right sides, are rounded. This is not a necessary feature, but helps the invention to rest more easily on the floor of the automobile, and makes the embodiment more flexible.

The lid (5) is on the top of the outer container in most embodiments. The lid (5) opens so that the user(s) can put trash into the outer container. The lid closes the opening through which trash passes, when the lid is closed. This also helps to reduce any odors resulting from the trash. The liner is below the lid. When the user opens the lid, and puts trash into the embodiment, the trash will fall into the liner. The lid then closes. This prevents trash from spilling out of the liner, which will make the vehicle neater because the trash will not spill out of the embodiment. It also reduces odors that may come from the garbage which is disposed of, because the odors will have to pass through the additional barrier of the outer container (1) before reaching the occupants of the automobile.

Many improvements to these basic components are discussed herein. For example, some embodiments of the invention discussed herein include an adjustable liner (34) instead of the regular liner (2) discussed in application Ser. No. 14/863,434. Other embodiments of the invention discussed herein include a regular liner.

Fundamental Information about the Slots

In most embodiments of the outer container, the back of the outer container (1) has six slots arranged in two rows of three. These rows are next to the corners between the back of the container and its right side, and the back of the container and its left side.

Corresponding rows of three slots each are on the left and right side of the outer container. The slots are large enough that the strap can pass through one of the slots on the back of the outer container, into the outer container, and then back out through the corresponding slot on either the left or the right side of the outer container, as illustrated in the drawings. A "corresponding pair" of slots, for purposes of this application, is one slot on either the left side, or the right side, on the outer container, and the closest slot on the back of the outer container, which is at the same height as the first slot.

The strap is placed along part of the back of the outer container. This method ensures that one continuous strap passes out from the slots on the leftmost part of the back of the outer container, and passes to the slots on the rightmost part of the back of the outer container, where the strap enters those slots. The strap then passes out of the slots on the right side of the outer container. The strap makes a loop which is large enough to surround one of the structures below either the driver's seat or front passenger seat of an automobile. The loop can also be adjusted to fit automobile seats of different sizes.

More than one strap can be used for this purpose, because the preferred embodiment has three slots each on the left side and three more on the right side, of the outer container.

The liner is inside the outer container, below the lid. When the user opens the lid and deposits trash inside the outer container, this trash falls into the liner, which is directly below the lid. The liner is a separate container that is generally roughly the same shape as the interior of the outer container, but slightly smaller than the interior, so that the liner can be removed from the interior of the outer container when needed. The regular liner has a flat back, a flat front, and two sides that curve into the flat front. It also has a bottom. Because the trash deposited by users falls into the liner, the user can remove all the trash in the embodiment by taking the liner out of the outer container and carrying it to a regular trash can to empty it. The user can then put the liner back in the outer container, to use again. The user can do this quickly, without having to undo the buckle or remove the whole embodiment from the vehicle. Furthermore, the embodiment is easier to clean because the garbage will have little or no contact with the outer container, and therefore the outer container will not need to be cleaned often. The liner is the main part of the embodiment that will need to be cleaned. These features and advantages are more convenient and save time for the user.

The liner of the basic version of the invention has two grooves in its interior, at the corners where the left and right sides of the liner reach the back of the liner. These grooves are near the top of the liner, and are positioned so that the user can place his fingers in these grooves, which will help the user to grip the liner when removing it from the outer container.

The adjustable liner can have similar grooves, at the corners where the left and right sides of the inner basin reach the back of the inner basin.

The liner or adjustable liner can also include two grab aids that jut out from the adjustable liner near the hinge of the lid. A user can use these grab aids to lift the liner out of the outer container.

The strap should be made of a material such as cloth or another material that has some capacity to stretch, and is strong enough that, when tightened, it can secure the outer container to the structure below the seats, or other components of the vehicle.

In another embodiment, the outer container has small, extendable "feet" as can be seen in the figures. These keep the outer container (1) stable while driving, so that the user(s) can put trash into it easily. Alternatively, the feet may not be extendable.

In still another embodiment, the outer container is opened by a spring.

Other information about improvements to the slots, and the liner, and additional components that fulfill the same features as these components, is included in the present patent application.

From this point on, in this application, when a "liner" is mentioned, this term shall refer to either a regular liner (2) or an adjustable liner (34), unless one or the other is specified.

The inventor would also like to note, that there can be two types, of each embodiment of the invention, with different widths. The wide version would be focused on vehicles with power seats, and the narrow version would be focused on vehicles with manual seats that may have a knob or lever that obstructs the invention from being placed in certain areas. The inventor believes that both versions of the invention would be effective with any automobile or related vehicle, but some types of the invention might be used more comfortably with certain vehicles, as noted above. The inventor also would also like to note that the width of the invention is a separate parameter from the height of the invention.

The versions of the invention discussed in this patent application can have one or more straps, and the inventor has found versions of the invention that have two straps to be very effective.

All versions of the invention, including those that use one or more straps to attach to components of the automobile, may also include foam padding on the back of the outer container. The foam padding helps to cushion the invention and the automobile components against damage that might come from the invention and the automobile components jostling against each other.

In most embodiments of the invention, the weight distribution of the lid (5) means that the lid will stay open, if it is opened and pushed past a pivot point. When the lid is pushed close to a completely closed position, the weight distribution of the lid will cause it to close completely. Lids with other weight distributions can be designed, and calculating the weight distribution of the lid is part of the prior art.

The First Embodiment

The first embodiment of the invention improves the ability for the user to change the height of the automobile trash can. This ability is highly useful for users to fit the automobile trash can to any type of automobile, and to automobiles and automobile seats of different sizes. The automobile trash can is "telescopic", because it includes the sizing knobs, which a user can place on several points, to adjust the height of the invention, and make the invention shorter or taller, as needed.

In most versions of the first embodiment, the outer container (1) will not have a bottom, and the shell will have a bottom, and the shell will fit into the outer container, when the outer container is lowered onto the shell. The shell will be the same shape as the outer container, and the trash falling through the lid of the outer container will fall into the liner, which will be inside an assembly of the shell and the outer container.

In most versions of the first embodiment, the walls of the shell (22) will include sizing holes (21) and the outer container (1) will have knob holes (35), and sizing knobs (28) will be part of the embodiment. The user will be able to keep the outer container at the level desired by the user, by placing the knob holes at the desired level, within the outer container, and then placing two or more sizing knobs (28) each through a sizing hole (21) and a knob hole (35). These sizing knobs will then prevent the shell from falling or rising within the outer container.

More details about the preferred method of doing this will follow.

The sizing knobs should each be able to fit through a knob hole and a sizing hole.

The sizing knobs (28) can be "plunger pins", which, in most embodiments, are each placed partway through a knob hole (35) in the outer container (1), with part of the plunger pin inside of the outer container (1), and part of the plunger pin outside the outer container (1). Most, but not all, kinds of plunger pins will be designed with the end outside the outer container larger than the diameter of the knob hole, so that most of the plunger pin, except for the end outside the outer container, can fit through the knob hole (35).

Specially designed plunger pins could be designed, for each plunger pin to be placed in the sizing hole (21) in the shell (22), with part of the plunger pin inside of the shell, and part of the plunger pin outside the shell.

Plunger pins are a type of pin that the user can pull or push, depending on the type of pin. Some type of plunger pins are pins with a spring-like mechanism, and other plunger pins are surrounded by large threads. Some of the pins with a spring-like mechanism are designed to be spring-loaded. Others are spring-loaded and partially surrounded by threads. All of these will achieve the intended purpose of plunger pins within the current invention, but the inventor believes that the spring-loaded pins will be most effective.

In some versions of the first embodiment, the spring-loaded plunger pins will each be placed through one of the knob holes (35) in the outer container. Part of the plunger pin will be inside the outer container. The user can pull on one of these plunger pins, and the part of the pin's length that is inside the outer container will be reduced. The spring will be stretched because of the tension. Then, the user can release the plunger pin, and the spring will spring back to its normal, un-stretched state. The length of the part of the plunger pin that is inside the outer container will be increased back to the length it held before the user pulled on the plunger pin.

The first embodiment includes a shell (22) which the outer container partially surrounds. The shell (22) has a bottom, and at least two walls that project (usually at a 90-degree angle relative to the bottom) from the bottom. The user controls the height of the outer container by placing the shell, with the outer container, on the floor of a vehicle, next to the seat, or in another location where the user wishes to install the invention. The shell rests on its bottom.

The shell has at least two rows of sizing holes (21), one row in each of these two walls of the shell (22) mentioned above. One possible location of these rows of sizing holes is shown in the drawings. Two sizing holes (21) that are on opposite sides of the shell, and are at the same height, on the shell (22), are a set of sizing holes. In many embodiments of the invention, the shell (22), includes a set of at least two sizing knobs, which can be plunger pins. In other embodiments of the invention, the sizing knobs are included in the outer container (1).

The shell is partially inside the outer container, and can be moved up or down within the outer container. The outer container will have two or more vertical rows of holes called knob holes (35). Each knob hole should be at a location on the outer container where a single sizing knob can be placed through that knob hole, and through a sizing hole on the shell that is being used with the outer container.

The user sets the height of the automobile trash can, in most versions of the first embodiment, by first pulling the plunger pins. This decreases the part of the length of each plunger pin that is inside the outer container, so that this plunger pin is less of an obstacle to the shell moving up and down inside the outer container (1). The user moves the shell up or down, within the outer container (1), to the height desired by the user, or as close to that height as possible. The user then aligns one or more sets of knob holes (35) with sets of sizing holes (21), with each of these sets of knob holes (35) aligned with one set of sizing holes (21). The user then releases the plunger pins, which releases the tension on the springs in the plunger pins. The spring in each plunger pin then moves back to its normal shape, causing the part of the length of that plunger pin that is inside the outer container to increase. The increased length of the plunger pin inside the outer container means that part of the plunger pin goes through the knob hole which is aligned with the sizing hole that the plunger pin already penetrated. These plunger pins create an obstacle to the shell moving up or down within the outer container, and keep the outer container at the desired height. The shell rests on its bottom, and the height of the outer container relative to the shell is fixed.

Plunger pins that are designed differently can also be used for this purpose. If the plunger pins are threaded, the user can rotate them and pull or push them, so that the plunger pins each penetrate one of the knob holes in the outer container and one of the sizing holes (21) in the shell.

Plunger pins could also be designed that are part of the shell, and are already inserted into the sizing holes before the user moves the outer container to the height desired by the user, so that the user can press down on, or rotate, the plunger pins to push them through the knob holes in the outer container. The plunger pins then each remain penetrating both a knob hole and a sizing hole, and each create an obstacle to the outer container moving up or down within the shell, that keeps the outer container at the desired height, in the same manner as described above.

The embodiment can theoretically have more than one set of plunger pins. If multiple sets of plunger pins are set to penetrate multiple sets of knob holes within each row and sizing holes within each row, this will make the automobile trash can stay more securely at its selected height. In theory, a user operating an example of the invention could arrange for fewer than all sets of plunger pins in the example of the invention, only one set of plunger pins in the example, or even one plunger pin in the example, to penetrate the knob holes in each row of knob holes, and sizing holes in each row of sizing holes. However, this will be less effective than using all of the plunger pins available in the example of the invention, and also if an odd number of plunger pins are used, the invention may become lopsided.

Plunger pins that are normally threaded through the knob holes in the outer container, but spring inward through the sizing holes in the shell, could also potentially be used. The user can push or pull the plunger pin partway through the sizing hole, until the plunger pin reaches a point where part of the plunger pin is inside the knob hole, and part of the plunger pin is inside the sizing hole, and the plunger pin will stay in the position set by the user.

Plunger pins equipped with a different type of spring-like mechanism, wherein, when the user pulls the plunger pin, and then releases the plunger pin, the spring mechanism causes more of the plunger pin's length to move inside the shell, can be used. The user would be able to take each plunger pin out of any knob hole by pulling on that plunger pin and moving the outer container. The user would be able to cause part of the plunger pin to enter the knob hole by pulling on the plunger pin and then releasing it. The plunger pin would have already been inserted through the sizing hole, in this example.

The vertical rows of sizing holes on the shell, and the vertical rows of knob holes in the outer container, should be positioned at locations on the shell and outer container (1), respectively, where the forces created by any sizing knobs placed through the knob holes and sizing holes will complement each other. One example of this is in the drawings, another applicable scenario is where the rows of knob holes and sizing holes are on opposite sides of the outer container (1) and opposite sides of the shell, respectively.

In theory, the outer container can have more than two vertical rows of knob holes, and/or the shell can have more than two vertical rows of sizing holes, provided that there is room on the shell or outer container for these vertical rows of sizing holes. A user can then place sizing knobs through sizing holes within more than two vertical rows, and place these sizing knobs in corresponding knob holes within more than two vertical rows.

"Sizing knobs" also includes other structures that perform the function of the sizing knobs described above, and embodiments of the invention including such other structures are included in the scope of the present invention. The most important characteristics of the sizing knobs are A. They should each be capable of being placed through a knob holes in the outer container and a sizing hole in the shell at the same time, when desired by the user, B. The sizing knobs should be capable of being placed in a position where the sizing knobs do not prevent the shell (22) from moving up or down within the outer container (1), and C. Each sizing knob should form a physical barrier to the shell moving further up or down within the outer container, when that sizing knob is placed through a knob hole in the outer container and also a sizing hole within the shell.

The outer container (1) and the components inside it usually weigh about 1.5 pounds, and so the plunger pins are sufficient to keep the outer container in the position where the user has placed the outer container. Use of multiple plunger pins for each row of holes helps this.

One manufacturer of plunger pins is "Innovative components", with the website Knobsource.com.

If the sizing knobs are threaded, the knob holes and sizing holes might also be threaded to help a user to "screw" the sizing knobs into the knob holes and sizing holes, and remove the sizing knobs when they are not needed.

A manufacturer may include the sizing knobs with the outer container, with the shell, or with neither, and simply make the sizing knobs available to be installed in the outer container or shell, when needed.

The Second Embodiment

The second embodiment of the invention includes a "tilting shelf" (24) that swings out from the outer container, so that the user can easily deposit trash or other items inside the outer container. The tilting shelf will usually be opened via the outer container's front, and will be inside the outer container, and will remain closed unless the user chooses to open the tilting shelf. The front of the tilting shelf will form a near-continuous surface with the rest of the outer container. The user can open the tilting shelf and cause the top of the tilting shelf to swing outward and downward, at an angle relative to the front of the outer container, while the bottom of the tilting shelf remains closer to the rest of the outer container. This is loosely analogous to the way in which the glove compartments on most automobiles swing outward and downward when they are opened.

The tilting shelf can be designed to hold the liner in various ways, so that when the tilting shelf swings outward, the liner will also swing outward, and the user will be able to deposit trash or other articles directly into the liner's opening. The positioning of the liner means that the user can still deposit trash in the liner by opening the lid (5) and dropping the trash through the lid into the liner.

In some embodiments of the invention, the tilting shelf holds the liner by one or two liner ledges, so that the user can open the tilting shelf, place the trash in the liner (which swiveled out of the outer container when the user opened the tilting shelf), and then push the tilting shelf so that it swivels back into the outer container.

The liner ledges are small brackets on the sides of the tilting shelf that grip the liner. Therefore, when the user opens the tilting shelf and the tilting shelf swings outward, the liner will also swing outward, and the user will be able to deposit trash or other articles directly into the liner's opening. The user can then push the tilting shelf and the liner back into the outer container.

Components of another design, that accomplish the same function, can also serve to hold the liner.

Many embodiments that have a tilting shelf will also include a button that the user can press to make the tilting shelf swing outwards. Some versions of this button will cause the tilting shelf to swing outwards in the same way that a glove compartment in an automobile swings outwards when a user presses on the button opening the glove compartment.

This embodiment of the invention can also include an adjustable liner (34), which will function in the same way as the regular liner that is included in most embodiments of the invention.

The latch on the tilting shelf may use a mechanism by which, the tilting shelf is kept closed by a hook that catches on a small rung that projects down from the main part of the outer container. When the user presses two buttons on the outside surface of the tilting shelf, this causes the hook to move, so that the hook is no longer caught on the rung. The tilted shelf therefore opens outward and down.

The tilting shelf may also be kept closed by a small clip on the top of the tilting shelf, which connects to the outer container. When the user wishes to open the tilting shelf, the user would open the clip, and the tilting shelf would fall open. When the user wishes to close the tilting shelf, he or she will push it to the point where the clip can be closed, and then close the clip.

Any other method, that is part of the prior art, can be used to cause the tilted shelf to stay closed most of the time, but to open when the user presses a button or latch on the outside part of the tilted shelf, or to open when the user desires the tilted shelf to open.

The Third Embodiment

The third embodiment combines characteristics of the first and second embodiments. It includes both the ability to adjust its height, and the "tilting shelf". The shell is designed so that it contains two or more walls, each wall having a row of sizing holes (21). There is a large gap next to the front of the outer container, where the shell has no wall. The tilting shelf is not obstructed here, so the tilting shelf can be opened, and closed. The user will select the correct height for the automobile trash can by placing the sizing knobs through the desired sizing holes in the shell and knob holes in the outer container.

The Fourth Embodiment

The fourth embodiment utilizes external tabs (45) on the outside of the outer container. Each external tab should ideally be at about the same position on the outer container as one of the slots in other embodiments of the invention. Alternatively, each external tab may be at about the same position on the outer container as a pair of the slots in other embodiments of the invention. Each external tab will include a solid portion that projects outward from the outer container, and a gap in between the solid portion and the outer container, so that the strap can be threaded through this gap. Each external tab will also include physical connections to the outer container, on both sides of the gap. This will hold the strap, once the strap is threaded through the gap between the solid portion of the tab and the outer container. The user can therefore attach the invention to any part of the vehicle that the user desires, by threading the strap through the external tabs, and looping the strap around vehicle components. In some embodiments, one external tab (45) can take the place of two slots (4), that are next to each other, because with slots, one slot is required for the strap to go into, and another slot is required for the strap to come out of, while with external tabs, the strap can go into and out of the same external tab. The user can also partially control the height of the automobile trash can relative to the floor of the vehicle by threading the strap through the external tabs located at the height which will allow the automobile trash can to be placed at the level desired by the user.

The Fifth Embodiment

The fifth embodiment includes a "roll-top" lid (26), in place of the lid (5). The roll-top lid is divided into a number of small segments, which are somewhat flexible relative to each other. These small segments are rectangular, and should each extend the entire width of the lid. There should be flexible connections between the small segments. When the roll-top lid is rolled up or down, the angles between the small segments change, so that the front of one small segment can point downward before the front of the small segment next to it. This can sometimes allow the user to roll the roll-top lid up or down more easily. Some versions of the outer container with the roll-top lid include runners on the inside of the outer container, next to the roll-top lid, for the roll-top lid to roll up or down into, when the user desires to open the roll-top lid. The figures show a cross-section of a version of the invention with the roll-top lid. In this way, the roll-top lid can "roll" up or down easily, to open or close the automobile trash can.

The Sixth Embodiment

The sixth embodiment is made out of clear material, such as clear plastic. This way, the user can see what is inside the automobile trash can. Alternatively, only part of the embodiment can be made out of clear material, such of plastic. For example, the lid (5), or one of the other components, can be made out of clear material, or alternatively, a panel within the outer container can be made of clear material such as plastic. That way, the user can see inside the automobile trash can, through this clear plastic.

The Seventh Embodiment

The seventh embodiment includes at least one dispenser (38) attached to the side of the outer container, or attached to the side of one of the walls of the shell. The dispenser(s) are containers that can hold tissues or other items. The dispenser(s) may theoretically be attached to another part of the invention, but the side of the outer container or one of the walls of the shell would probably be best. An embodiment of the invention could also have multiple dispensers in multiple places; For example, one dispenser on the side of the outer container and one or more dispensers on one of the walls of the shell. A dispenser may be open all of the time, or closed some of the time. A dispenser may also be permanently attached to the automobile trash can, or detachable. Methods of making the dispenser detachable include connecting it to the component, to which the dispenser is attached, via Velcro, via a rod attached to the dispenser that fits into an insert in another component of the automobile trash can, or via any method that is part of the prior art. The existence of the dispenser makes the automobile trash can multifunctional.

The Eighth Embodiment

The eight embodiment includes one or more holder rings. In most embodiments of the automobile trash can, the top of the outer container (1) can be detached from the rest of the outer container (1). The holder ring can be used in the following manner: A user can place a trash bag inside the embodiment, and then use the holder ring to grab and hold the outer edges of the trash bag to the outside of the embodiment. This ensures that the trash bag does not "bunch up" inside the automobile trash can, that the trash bag stays open and ready for use. The holder ring is a ring (usually elastic) that can be placed on the outer container, the liner (either a regular or adjustable liner), or holder rings can be placed around both the outer container and liner. The holder ring is normally wrapped around one of these components, but can be stretched, to allow something to be inserted between the outer container or liner and the holder ring. The user stretches the holder ring, places part or all of the outer edge of the trash bag between the holder ring and the liner or outer container, and then the user releases the holder ring and the holder ring snaps back into place. The user can then stretch the holder ring again and place another part of the edge of the trash bag between the holder ring and the liner or outer container, until the complete edge of the trash bag is between the holder ring and the liner or outer container (whichever the holder ring surrounds). The holder ring will snap back into place again. The holder ring can therefore hold the trash bag in place, with the bag staying fully open. Most of the bag will be inside the liner or the outer container, and trash placed inside the bag will not directly soil the liner or the outer container.

The user could therefore use the holder ring to hold the edges of the trash bag to the outside of the outer container, while the trash bag extends into the liner, and most of the trash bag is inside the liner.

The user could also use the holder ring to hold the edges of the trash bag to the outside of the liner, while most of the trash bag is inside the liner.

A user could put a second holder ring next to the part of the bag that is touching the inner wall of the liner, to hold the bag to the inner walls of the liner, or alternatively put a second holder ring next to the part of the bag that is touching the walls of the outer container, to hold the bag to the inner walls of the liner, if desired.

This improves the functioning of the invention, because the invention will be easier to clean if trash inside the automobile trash can falls into a bag which can be removed from the liner easily, or a bag which can be removed from the outer container easily.

The Ninth Embodiment

The ninth embodiment of the invention involves an outer container that is made from flexible material, such as rubber or canvas material. This is the flexible outer container (8).

Some versions of this embodiment will include a lid made out of rigid material, like the other embodiments.

Other versions of this embodiment will include a lid that is made out of flexible materials, and include an aperture through the lid. The user can push items through the aperture and into the liner.

The aperture has a zipper, and can be opened or closed using the zipper, in most versions of the ninth embodiment.

In other versions of the ninth embodiment, the lid will be composed of canvas material, and a thin opening within the canvas material (preferably in the center of the lid) will be the aperture. In some versions, the opening will take the shape shown in the drawings, but versions of this embodiment with apertures having different shapes are also part of the present invention. These versions of the ninth embodiment will be made out of a material that is somewhat flexible but sufficiently stiff, so that the material will bend back into position if a user uses his or her hand to push an item through the aperture. The user will operate these versions by pushing items through the aperture. The lid might bend temporarily as the user pushes an item through the aperture, and will then bend back into position, leaving the aperture as the thin opening in the lid.

This effect might be achieved by making the lid, composed of canvas or rubber, very tight.

One version of the ninth embodiment involves an outer container and a lid that can be built out of vulcanized rubber. A second version utilizes an outer container and lid made out of canvas material.

In theory, the lid could be made out of rubber or canvas material, while the outer container is made out of plastic or another inflexible material.

The Tenth Embodiment

The tenth embodiment of the invention includes a "trap door" (32) in the lid (5). This allows a user to easily poke the trap door open and place small objects inside the outer container. To place larger objects inside the outer container, the user will still have to open the lid itself. The trap door is essentially a smaller lid, located inside the lid. The trap door can be pushed or pulled open, independently of the lid, for the user to drop an object into the embodiment, and the object will fall into the regular or adjustable liner inside.

In some versions of this embodiment, the trap door will not be spring-loaded.

In some versions of this embodiment, the lid will have a raised and rounded, or lowered and rounded, portion next to the trap door, in much the same way that the outer container has a raised and rounded, or lowered and rounded, portion next to the lower end of the lid.

The trap door can be spring-loaded, in that it would have one or more small springs attached to the underside of the trap door, and also attached to the underside of the lid or inside of the outer container. In most versions, the trap door will normally be in the closed position. When the user presses down on the trap door, this will compress the spring. The user can drop an item of trash into the trap door, and release the trap door. The spring will then release the compression, lengthen, and cause the trap door to swing back into the closed position.

The spring can also be attached to the top of the trap door, and to the lid or outer container. The user pressing down on the trap door will lengthen the spring, so that, when the user releases the trap door, the spring will compact back to its regular position, and will pull the trap door closed.

The trap door can also be spring-loaded in the following manner: The user would open the trap door by pressing down on it. This would compress a spring, which would then spring upward and cause the trap door to go upwards, therefore opening the trap door. The trap door would open and close by swiveling on a pivot point. The trap door would swing past a pivot point, so that the part of the trap door which was going down would have to continue going down, thus causing the opening part of the trap door to swing up. The spring would be placed below the lid, preferably in a location where the spring would not obstruct the flow of trash through the trap door.

A spring-loaded trap door can be designed to open towards the front or the back, but the inventor thinks it will be more desirable for the spring-loaded trap door to be opened towards the back.

The Eleventh Embodiment

The eleventh embodiment uses an "adjustable liner" (34). This adjustable liner has an outer basin and an inner basin, and in most embodiments, the outer basin of the adjustable liner has the ability to "slide" up or down over the inner basin, allowing the user to increase or decrease the height of the adjustable liner. In another version of the eleventh embodiment, the inner basin of the adjustable liner has the ability to slide up or down over the outer basin. These two designs allow the user to increase or decrease the height of the adjustable liner, to change the height of the adjustable liner to fit the user's preferences, and also to fit the automobile or other vehicle where the user wishes to employ the automobile trash can.

The outer basin and inner basin will have to be designed so that the length and width of the inner basin are very close to the length and width, respectively, of the area inside the walls of the outer basin. This is so that the walls of the inner and outer basins have contact with each other.

The inner basin has an opening in its top, so that trash or other items can fall into the inner basin. The outer basin has four walls that surround the inner basin, and also has an opening on its top, in the same location as the opening in the inner basin. Therefore, trash thrown into the hole will fall through both the opening in the outer basin and the opening in the inner basin.

In most embodiments, the outer basin will be wide enough that the inner basin can fit inside the outer basin, and the outer basin will have a slightly larger length and width than the inner basin that it surrounds, and the outer basin will not have a bottom. The material comprising both the outer basin and the inner basin will be of a type that allows the walls of the outer basin to slide over the walls of the inner basin, thus allowing a user to move the outer basin upward or downward to a point where the top of the outer basin is at a desired height.

Smooth plastic is one material that could be used to make the outer and inner basins.

If the top of the walls of the outer basin is above the top of the walls of the inner basin, the top of the walls of the outer basin will be the highest point on the adjustable liner, and, in some embodiments, the bottom of the inner basin will rest on the bottom of the outer container. If the top of the walls of the inner basin is above the top of the walls of the outer basin, the top of the walls of the inner basin will be the highest point on the adjustable liner, and, in some embodiments, the bottom of the walls of the outer basin will rest on the bottom of the outer container.

Once the user has adjusted the outer and inner basins to the desired point, relative to each other, the outer basin and inner basin can be kept at or near the desired position relative to each other in several ways.

In other embodiments, the bottom of the inner basin will be the lowest point on the adjustable liner, but the top of the outer basin will be raised and lowered in tandem with the opening in the top of the outer container (1) that is usually covered by the lid (5).

These embodiments shall contain the following modifications: The rim of the opening covered by the lid includes a portion that protrudes slightly outward, into the opening. This portion is below the lid and does not disturb the lid. The outer basin's very top is slightly flared, and so this top can "hang" onto the protruding portion of the rim. This allows the adjustable liner to move up or down, as the top of the outer container moves up or down.

The upper part of the outer basin also contains another, wider area, along the inner walls of the outer basin. This area will be all the way around the inner walls of the outer basin, and will be raised about 1/16 of an inch (0.15875 cm) over the rest of the inner walls of the outer basin. The inner basin will therefore not be able to move up over this area, because it will not have room to do so. The raised area will block the inner basin from doing this. Near the bottom of the outer walls of the inner basin, there will be another raised area, which will extend all the way around the outer walls of the inner basin, and will be raised about 1/16 of an inch (0.15875 cm) over the rest of the outer walls of the inner basin. This will prevent the outer basin from sliding down over the walls of the inner basin below this raised area.

In this version of the invention, the outer basin and inner basin can move, relative to each other, in the area between the raised area in the outer basin and the raised area in the inner basin. The outer basin and inner basin will also move up and down as the opening in the outer container moves up and down.

This version of the invention provides additional benefits, because whatever falls into the outer container (1) will fall directly into the adjustable liner (34).

In another version, the adjustable liner (34) has an upper section and a lower section. The top of the upper section includes a small shelf that projects outward, and this can catch on the protruding part of the rim of the opening. The bottom of the upper section includes at least one small ledge (The second ledge) on its inner wall. Preferably, second ledges should be located on at least two inner walls on opposite sides of the adjustable liner, and at the same height within the adjustable liner. The lower section includes, on its outer wall, a small ledge (first ledge) that is above the ledge that is part of the upper section (second ledge). The first and second ledges are positioned so that if the second ledge moves down sufficiently, it will push against the first ledge, and if the first ledge moves up sufficiently, it will push against the second ledge. Ideally, the first and second ledges should project in opposite directions, and the second ledge should be above the first.

The first ledge can also be on the outer wall of the upper section, and, if this is the case, the second ledge should be on the inner wall of the lower section.

The upper and lower sections are designed to slide against each other, so that the walls of the lower section allow it to slide down, until the lower section reaches a point where either A) the second ledges and first ledges push against each other, so that the lower section can no longer fall, or B), the bottom of the adjustable liner hits an obstacle, such as the bottom of the outer container. The upper section of the adjustable liner, meanwhile, does not fall, because it hangs from the rim of the opening in the outer container.

The inventor does not believe that a version of the adjustable liner involving sizing knobs, knob holes, in the outer liner, and sizing holes, in the inner liner, will be highly demanded, but such a version of the adjustable liner, that works along similar principles to those guiding the way that the outer container works in the first embodiment, is possible. Another structure that performs the same function can be used as the sizing knobs, and embodiments of the adjustable liner, including such other structures, are included in the scope of the present invention. The most important characteristics of the sizing knobs are A. They should be capable of being placed through the knob holes in the inner basin and the sizing holes in the outer basin at the same time, when desired by the user. B. The sizing knobs should be capable of being placed in a position where the sizing knobs do not prevent the outer and inner basins from moving up or down relative to each other, and C. Each sizing knob, when that sizing knob is placed within one of the sizing holes in the outer basin and one of the knob holes in the inner basin, should form a physical barrier to the inner basin moving further up or down within the outer basin.

The adjustable liner (34) usually weighs much less than 1.5 pounds, and so the modifications discussed herein are sufficient to keep the inner and outer basins in the position where the user has placed it.

In still another version of this embodiment, the inner basin contains two or more sizing shelves that are normally tucked against the inner basin's walls, but can flip out over the top of the walls of the outer basin, preventing the inner basin from descending completely into the outer basin, and allowing the user to increase the height of the adjustable liner, if desired. When tucked against the inner basin's walls, the sizing shelves do not prevent the inner basin from descending completely into the outer basin. This version of the embodiment can have more than two sizing shelves, with some sizing shelves lower than the others. Then the user can flip out the sizing shelves that will push into and resist the tops of the walls of the outer basin, and block the inner basin from descending further than the user desires into the outer basin. The user can also refrain from flipping out the other sizing shelves, so that these do not prevent the inner basin from descending to the level desired by the user.

In some embodiments of the adjustable liner, the user can also choose the positions of the adjustable liner in this way: The outer basin of the adjustable liner will have several small shelves or other protrusions along its outer walls, that can stick out from the adjustable liner into grooves on the inside of the outer container. These shelves can normally be folded in a way that they do not stick into these grooves, but they can also be flipped outwards, so that they "catch" along the specific grooves desired by the user, keeping the outer basin and inner basin from falling further into the outer container, and keeping them at the level desired by the user. The same principle works if the outer basin uses other protrusions, in that these will also fit into grooves on the inner walls of the outer container (1) when desired by the user.

In another embodiment of the adjustable liner, the inner basin is slightly wider and longer than the outer basin, and the inner basin does not have a bottom, but the outer basin does. The user can then move the inner basin and outer basin up and down relative to each other, and use sizing knobs or one of the other methods described herein to keep the inner basin and outer basin at the desired positions, relative to each other.

Another method is to use friction to hold the inner liner and outer liner in place, once they have been placed in the position desired by the user.

Please note that an adjustable liner can theoretically have one outer basin surrounding the inner basin, and then a second outer basin surrounding the first outer basin, etc. The widest of these outer basins could then have a flared top, so that it "hangs" on the protruding part of the rim of the opening, below the lid. However, the inventor does not believe that most versions of the invention that are purchased by consumers will have more than one outer basin.

The Twelfth Embodiment

In the twelfth embodiment, the lid can be spring-loaded, and would have one or more small springs attached to the underside of the lid, and also attached to the inside of the outer container. In most versions, the lid will normally be in the closed position. When the user presses down on the lid, this will compress the spring. The lid will open. The user can drop an item of trash through the lid, and release the trap lid. The spring will then release the compression, lengthen, and cause the lid to swing back into the closed position.

Other Embodiments

Other versions of the automobile trash can discussed herein, with different combinations of the characteristics of the embodiments discussed herein, are explicitly part of the present invention. Versions of the automobile trash can that contain the characteristics of more than one of the embodiments discussed herein are also part of the present invention. For example, a version of the invention combining the characteristics of the first, tenth, and eleventh embodiments of the invention is explicitly within the scope of the invention.

The discussion included in this patent is intended to serve as a basic description. The reader should be aware that the specific discussion may not explicitly describe all embodiments possible, and alternatives are implicit, or obvious to those skilled in the art. Also, this discussion may not fully explain the generic nature of the invention and may not explicitly show how each feature or element can actually represent equivalent elements. Again, these are implicitly included in this disclosure. Where the invention is described in device-oriented terminology, each element of the device implicitly performs a function. It should also be understood that a variety of changes may be made to the embodiments that have been described, without departing from the essence of the invention. Such changes are implicitly included in the description. These changes still fall within the scope of this invention.

Furthermore, each of the various elements of the invention and claims may also be achieved in a variety of manners. This disclosure should be understood to encompass each such variation, whether it is a variation of an apparatus embodiment, a method embodiment, or a variation in any element of an embodiment. As the disclosure relates to elements of the invention, the words describing each element may be replaced by equivalent apparatus terms, even if only the function or result is the same. Such equivalent, broader, or even more generic terms should be considered to be encompassed in the description of each element or action. Such terms can be substituted, when desired, to make explicit the implicitly broad coverage to which this invention is entitled. It should be understood that all actions may be expressed as a means for taking the action in question, or may be expressed as an element for causing the action in question. Similarly, each physical element disclosed should be understood to encompass a disclosure of the action which that physical element facilitates. Such changes and terms are to be understood to be explicitly included in the description.

Another group of embodiments of the invention involves some of the components being made of clear plastic or another clear material. The lid (5), the outer container (1) and the shell and the liner are among the components that can be made out of clear plastic. A version of the invention with a clear lid and outer container will have the advantage that the user can see inside the embodiment of the invention, and will know when it is getting full.

Some Additional Uses of the Invention

The inventor has also found that the invention can be strapped behind the driver's seat or passenger's seat of an automobile. Embodiments of the invention can also be installed in airplanes, boats, buses, and school buses, among other vehicles.

Embodiments of the invention can be installed in places such as airplanes. An airline, for example, may use embodiments of the invention to store snacks for the passengers, eliminating the need for flight attendants to pass out snacks for the passengers. An airline can also use embodiments of the invention, stored on the backs of seats, to store board games or coloring books for children, so that children on the flight do not become board. An airline can also store "vomit bags" inside versions of the invention on the back of seats. Then, if a passenger has to use one of the "vomit bags", he can store it inside the embodiment of the invention strapped to the back of the seat in front of him. Then, when the airline cleans the aircraft, they will hopefully only have to clean the embodiment of the invention, not the whole seat.

A school district could place examples of the invention near the seats on school buses. These examples could contain snacks for the children, toys, pens and pencils, or virtually anything else. This might help the children to avoid becoming bored on long journeys (such as field trips), and also help them to learn.

An automobile owner could theoretically have multiple examples of the invention, in his automobile. The owner could use one example of the invention to store trash, for trash, another one, near a car-seat, to store toys, and another to store other things. These examples could all be examples of the same embodiment, or of different embodiments.

Screws (12) can be seen inside the embodiment. They help to keep the embodiment together. This embodiment also includes an adjustable liner (34).

Figure 4:
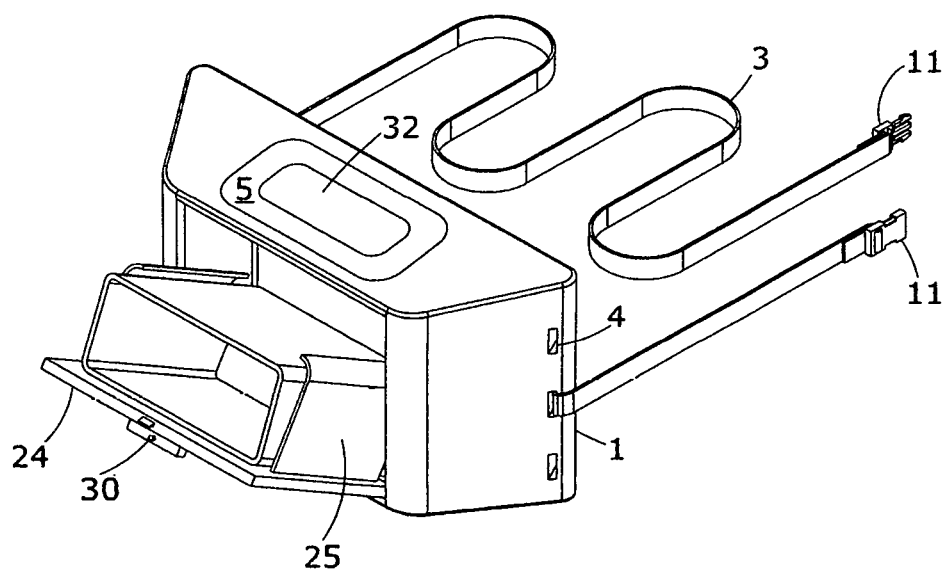

FIG. 4 shows a version of the second embodiment of the invention, with the "tilting shelf" swung outward. This version of the invention also includes a trap door in the lid on top of the outer container.

Figure 5:
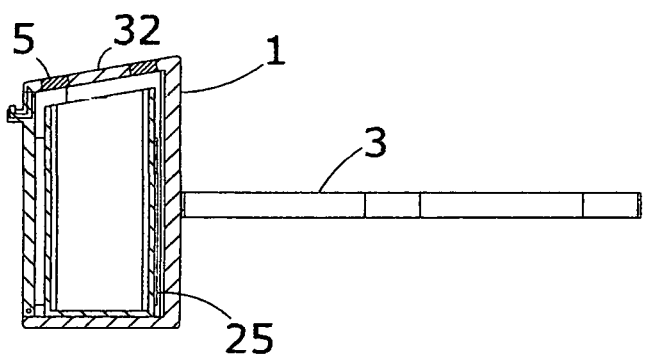

FIG. 5 shows a "cut-away" version of the second embodiment, so that the user can see the tilting shelf, closed, and a regular liner inside the tilting shelf, and the liner ledges. The tilting shelf is also held closed by a clip here.

Figure 6:
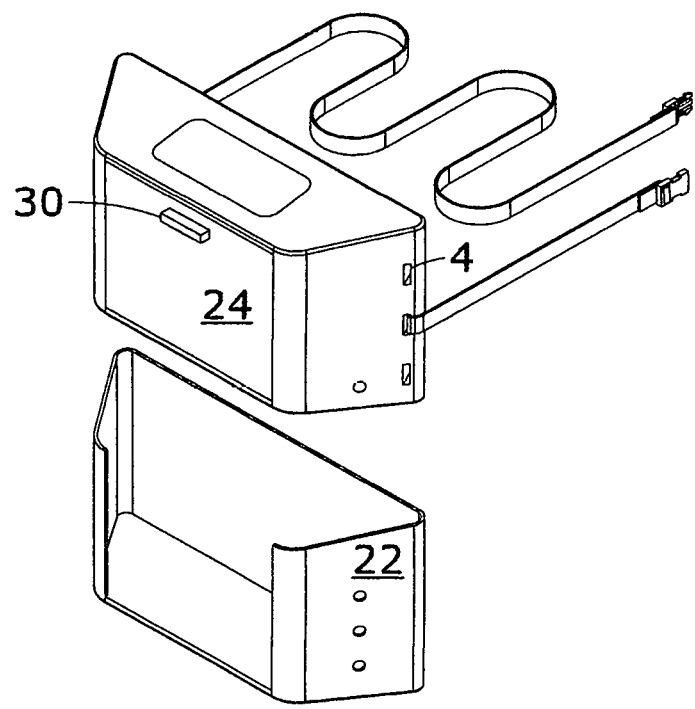

FIG. 6 shows a version of the third embodiment, with the outer container and a shell. The gap between the two walls of the shell can be seen, and the tilting shelf can open through this gap.

Figure 7:
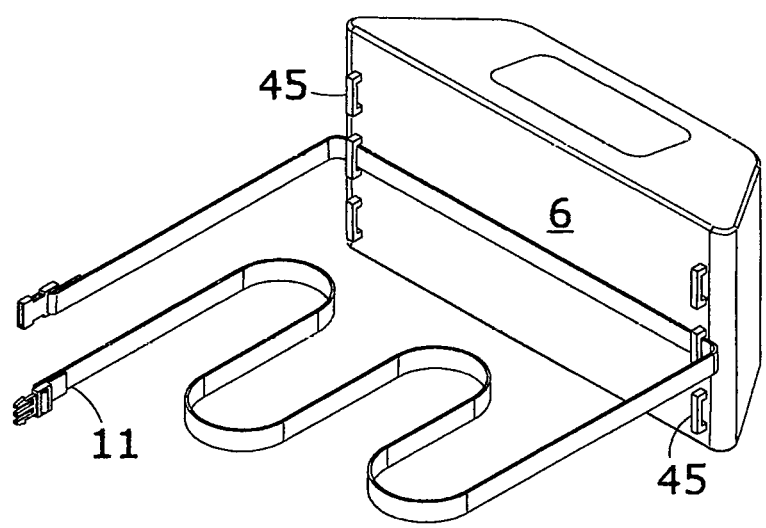

FIG. 7 shows the fourth embodiment of the invention, with external tabs, and with the strap threaded through some of the external tabs. The viewer can conclude that threading the strap through these tabs (45) will probably be easier than threading it through the slots.

Figure 8:
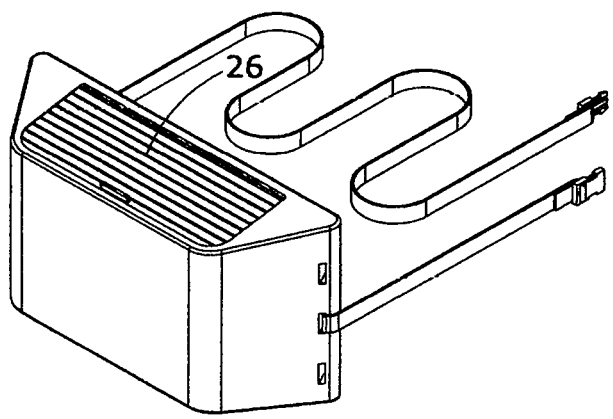

FIG. 8 shows a bird's eye version of the fifth embodiment of the invention, with a roll-top lid.

Figure 9:
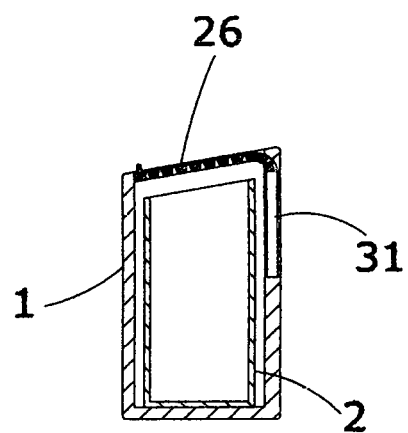

FIG. 9 shows a cut-away version of the invention, with a roll-top lid. The user can see the runners that the roll-top lid rolls on.

Figure 10:
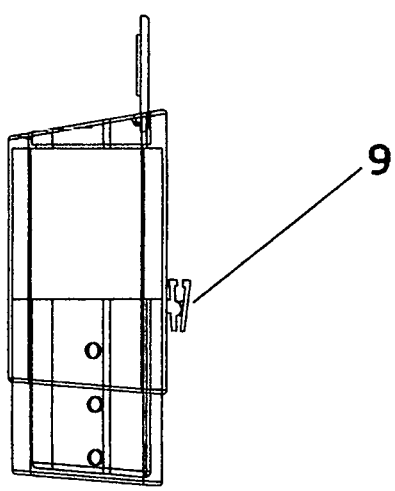

FIG. 10 shows an embodiment including characteristics of the sixth embodiment of the invention, with the outer container and lid composed of clear material.

Figure 11:
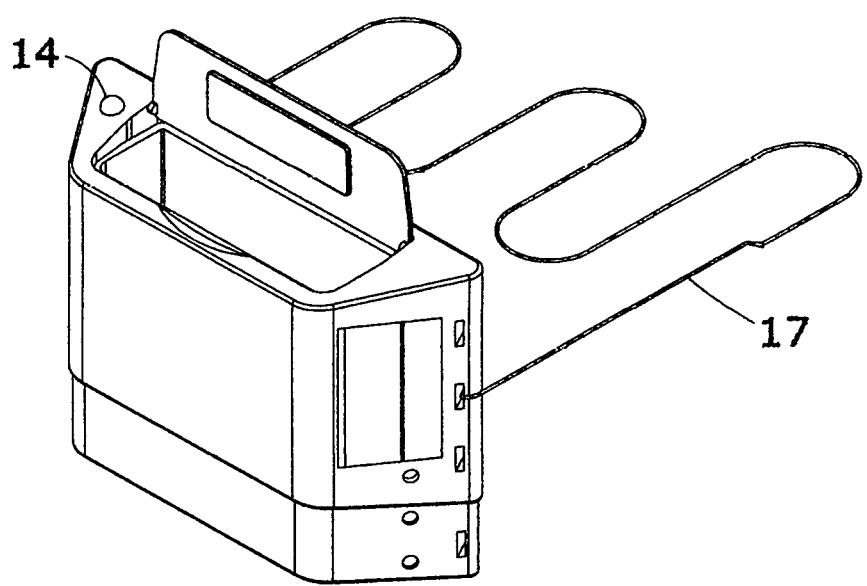

FIG. 11 shows a version of the sixth embodiment of the invention, with a panel composed of clear material.

Figure 12:
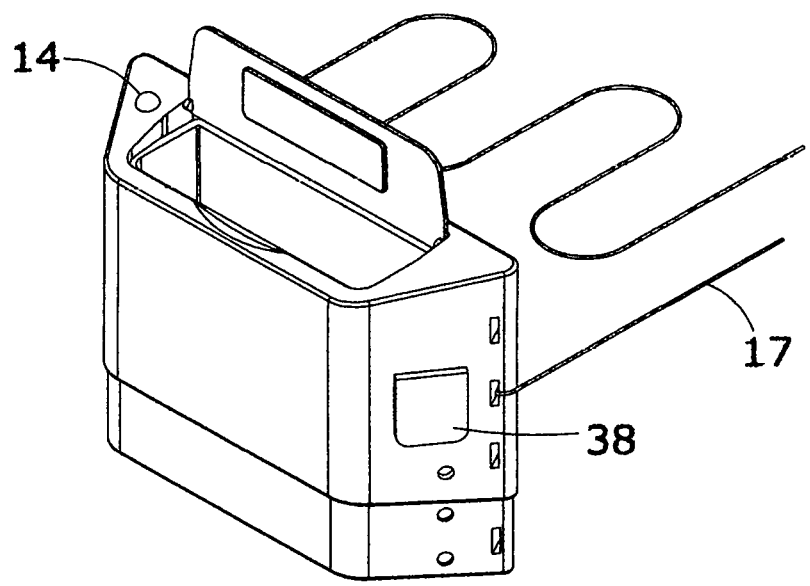

FIG. 12 shows an embodiment including characteristics of the seventh embodiment of the invention, with a dispenser containing tissues on its side.

Figure 13:
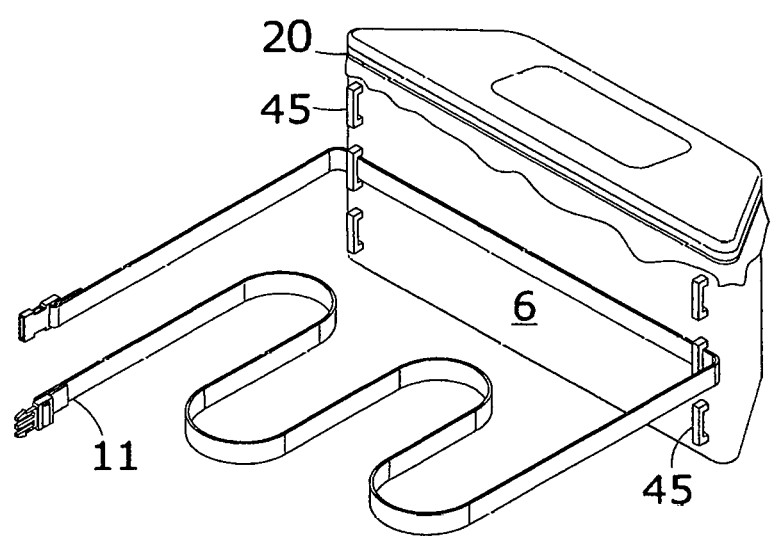

FIG. 13 shows an embodiment including characteristics of the eighth embodiment of the invention, with a holder ring surrounding the outer container and the edges of a garbage bag, which is tucked inside the holder ring.

Figure 14:
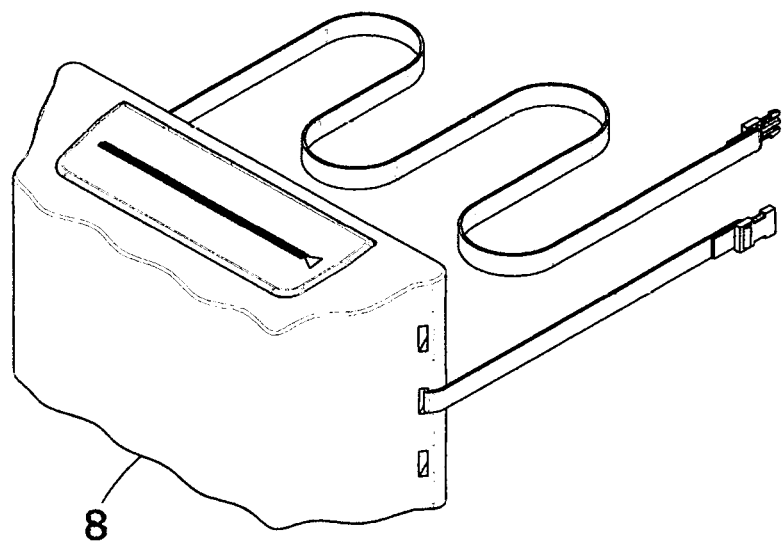

FIG. 14 shows a version of the ninth embodiment of the invention from above and to the side.

Figure 15:
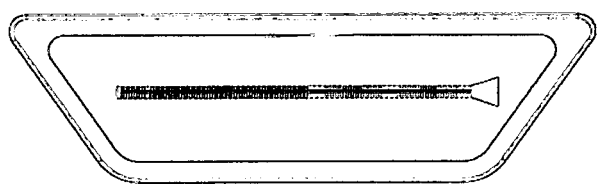

FIG. 15 shows a version of the ninth embodiment of the invention from directly above.

Figure 16:
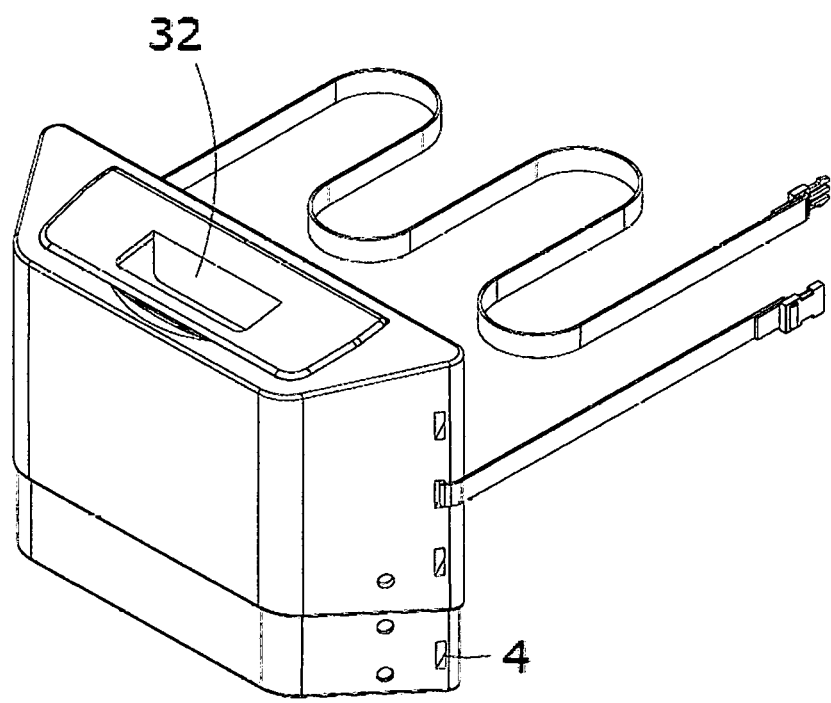

FIG. 16 shows a version of the tenth embodiment of the invention.

Figure 17:
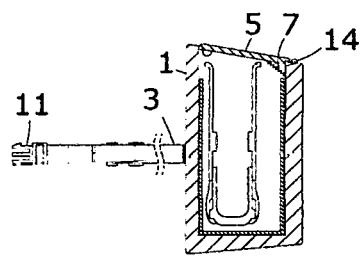

FIG. 17 shows a cut-away version of the twelfth embodiment of the invention, showing the spring-loaded trap door.

Figure 18:
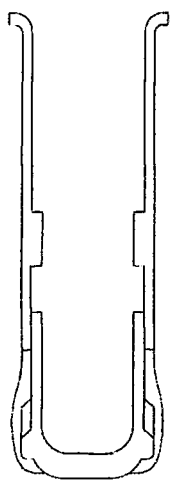

FIG. 18 shows a close-up view of one version of the adjustable liner.

Figure 19:
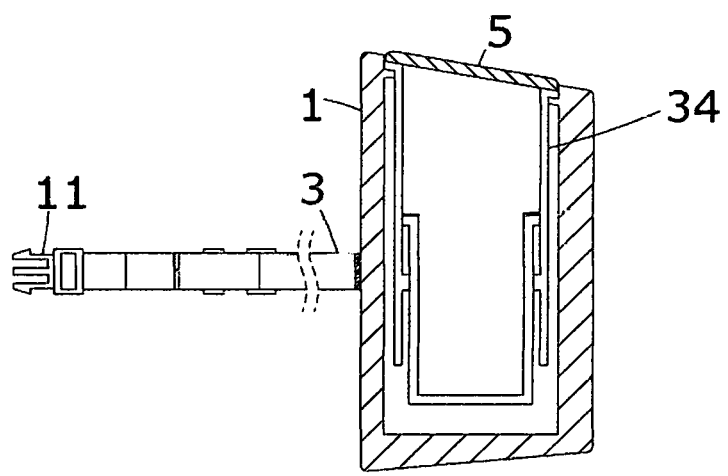

FIG. 19 shows a cut-away view of one version of the eleventh embodiment of the invention with a version of the adjustable liner.

Figure 20:
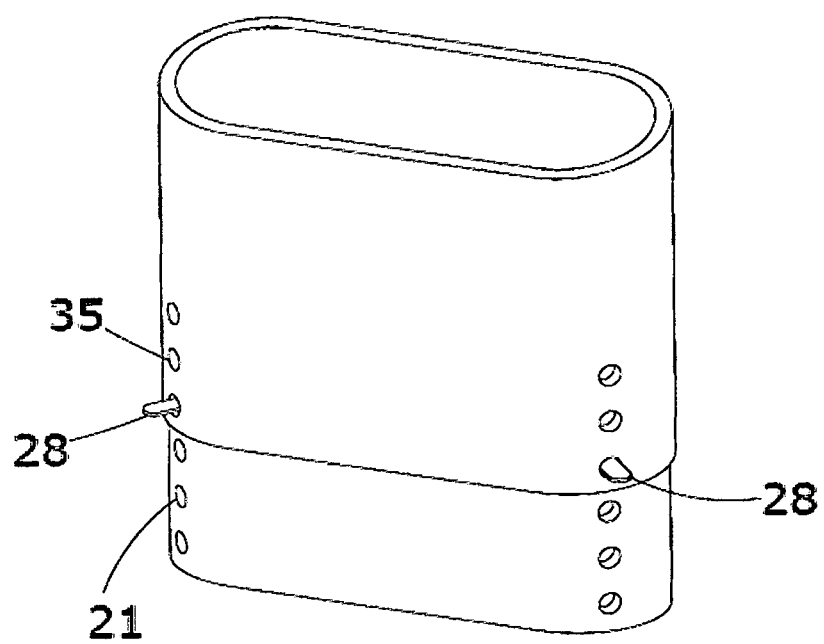

FIG. 20 shows a close-up view of another version of the adjustable liner.

Figure 21:
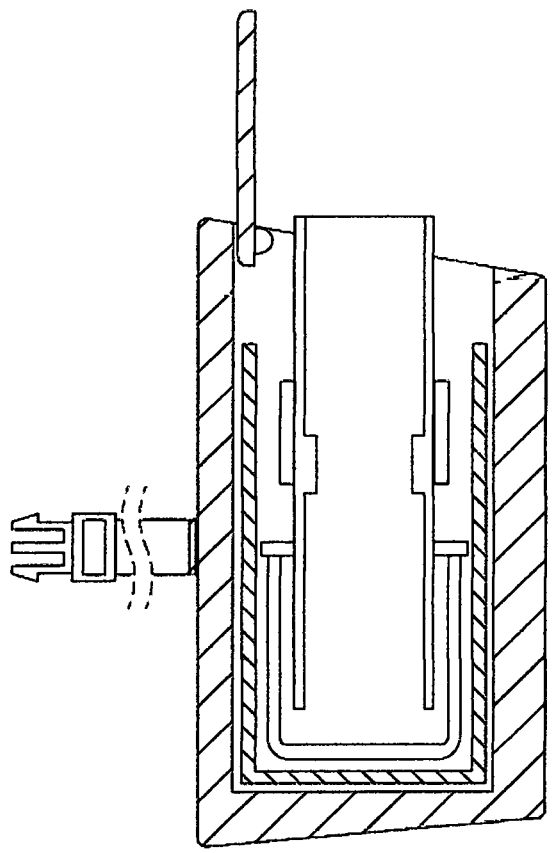

FIG. 21 shows a cut-away view of the eleventh embodiment of the invention with another version of the adjustable liner.

Figure 22:
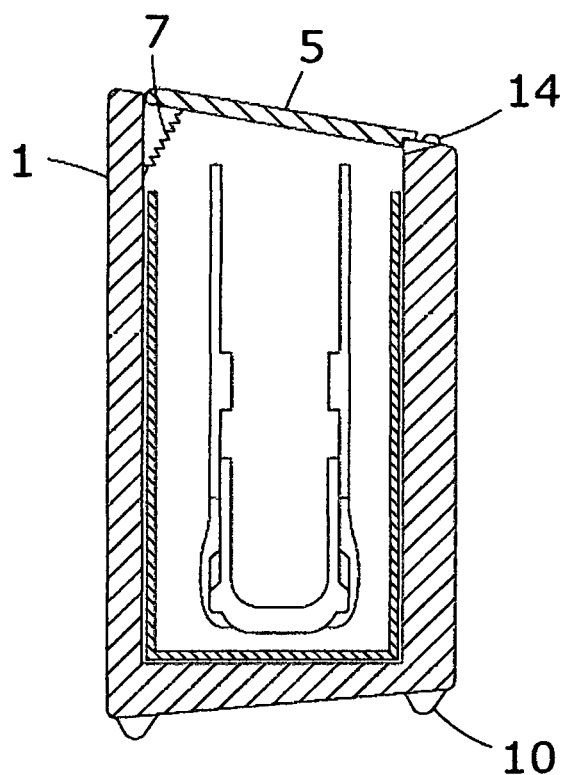

FIG. 22 shows a cut-away view of a version of the twelfth embodiment of the invention.

Figure 23:
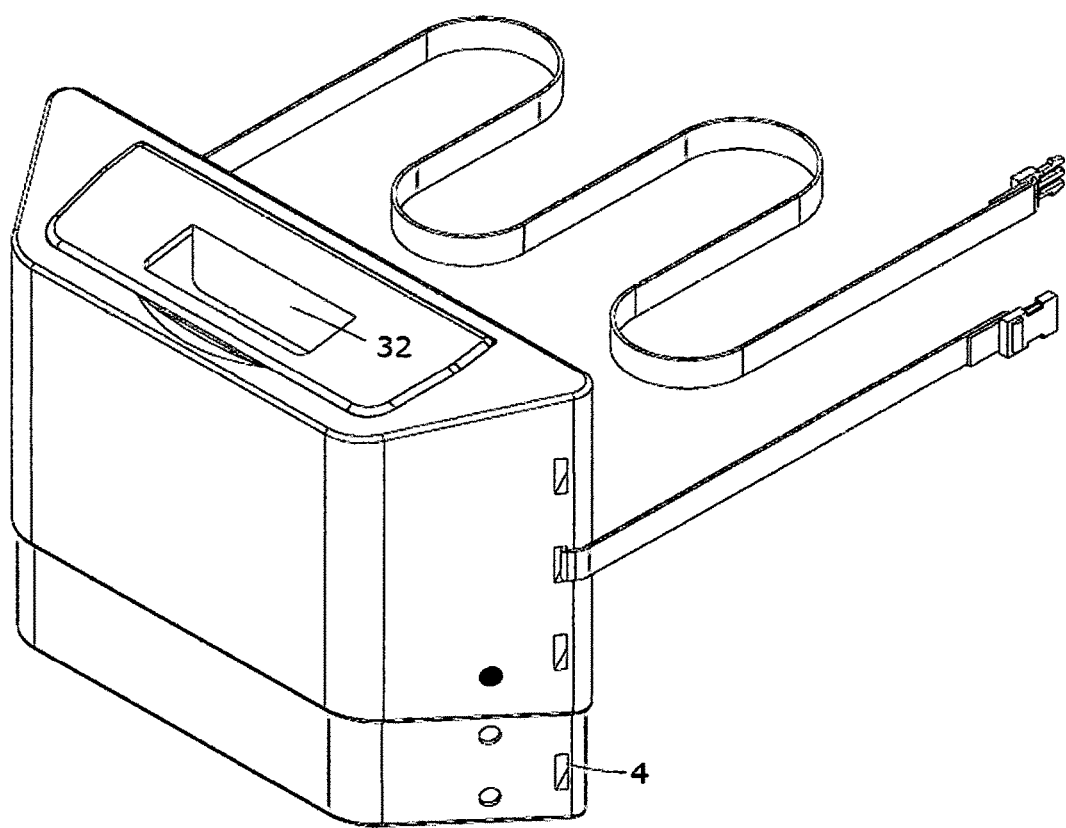

FIG. 23 shows a view of an embodiment incorporating characteristics of the first and twelfth embodiments of the invention from the front and above.

Figure 24:
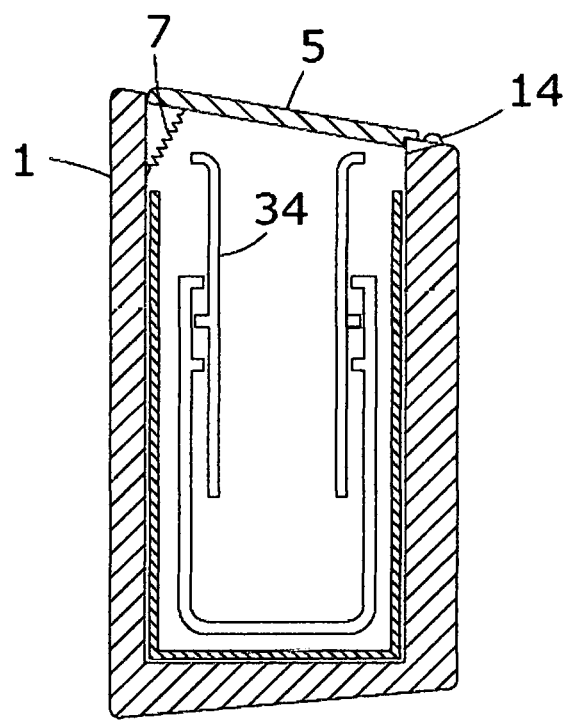

FIG. 24 shows a cut-away view of a version of the eleventh embodiment of the invention, including a version of the adjustable liner that includes a first ledge, placed on the adjustable liner's lower section, and a second ledge, placed on the adjustable liner's upper section.

DETAILED DESCRIPTION OF THE DRAWINGS

Figure 1:
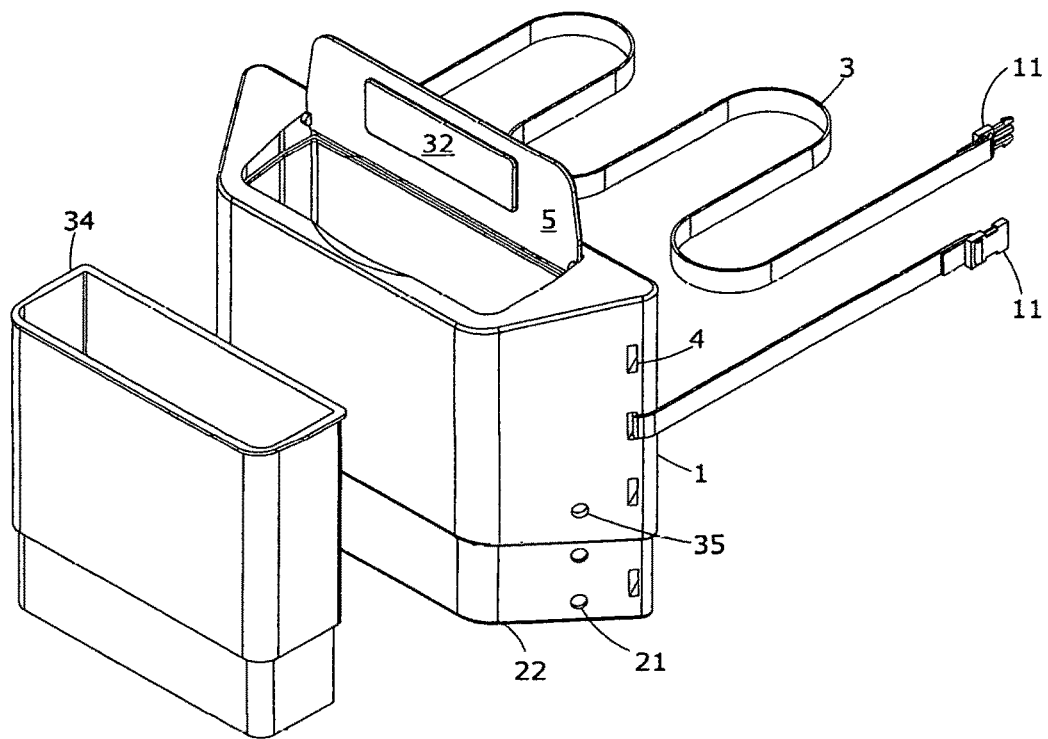
FIG. 1 shows a perspective view of an embodiment of the invention, with an outer container, shell, strap, adjustable liner, and trap door. The lid (5) is open, and the underside of the trap door (32) can be seen. The shell (22) is partially inside the outer container (1) and partially surrounded by the outer container (1). Slots can be seen in both the outer container and shell. The viewer can also see some of the sizing holes (21) in the shell, and one of the knob holes (35) in the outer container. The strap (3) is threaded through two of the slots (4), and the strap has the parts of a buckle (11) at its ends. The adjustable liner (34) is outside the outer container, and the inner basin has slightly greater length and width than the outer basin.

FIG. 1 shows a perspective view of an embodiment of the invention, with an outer container, shell, strap, adjustable liner, and trap door. The lid (5) is open, and the underside of the trap door (32) can be seen. The shell (22) is partially inside the outer container (1) and partially surrounded by the outer container (1). Slots can be seen in both the outer container and shell. The viewer can also see some of the sizing holes (21) in the shell, and one of the knob holes (35) in the outer container. The strap (3) is threaded through two of the slots (4), and the strap has the parts of a buckle (11) at its ends. The adjustable liner (34) is outside the outer container, and the inner basin has slightly greater length and width than the outer basin.

The adjustable liner includes an inner basin and outer basin. The upper part of the outer basin also contains a wider area, all the way around the inner walls of the outer basin, raised about $\frac{1}{16}$ of an inch (0.15875 cm) over the rest of the inner walls of the outer basin. Near the bottom of the outer walls of the inner basin, there is another raised area, extending around the outer walls of the inner basin, and raised about $\frac{1}{16}$ of an inch (0.15875 cm) over the rest of the outer walls of the inner basin.

Figure 2:
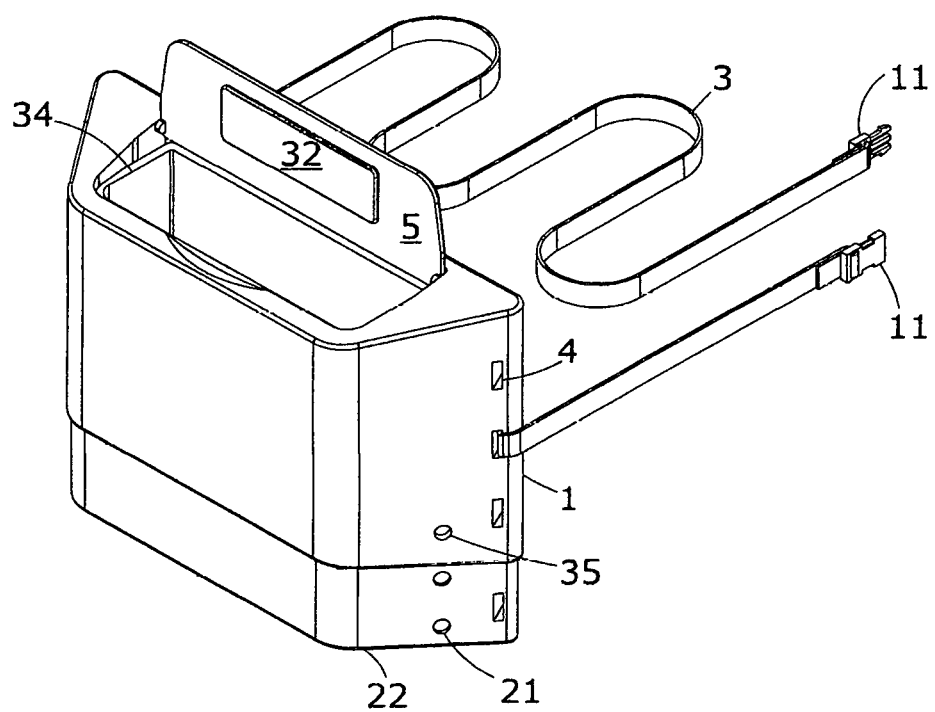
FIG. 2 shows a cut-away version of the same embodiment of the invention as FIG. 1, but this time the adjustable liner is inside the outer container and shell. The viewer can see how the flared top of this particular embodiment of the adjustable liner rests upon the of the rim of the outer container, near the lid.

FIG. 2 shows a cut-away view of the same embodiment of the invention as FIG. 1, but this time the adjustable liner is inside the outer container and shell. The viewer can see how the flared top of the adjustable liner rests upon the of the rim of the outer container, near the lid. The viewer can also see how the raised areas of the outer liner and inner liner allow the outer liner to fall a certain distance below the bottom of the inner liner, but not any further.

Figure 3:
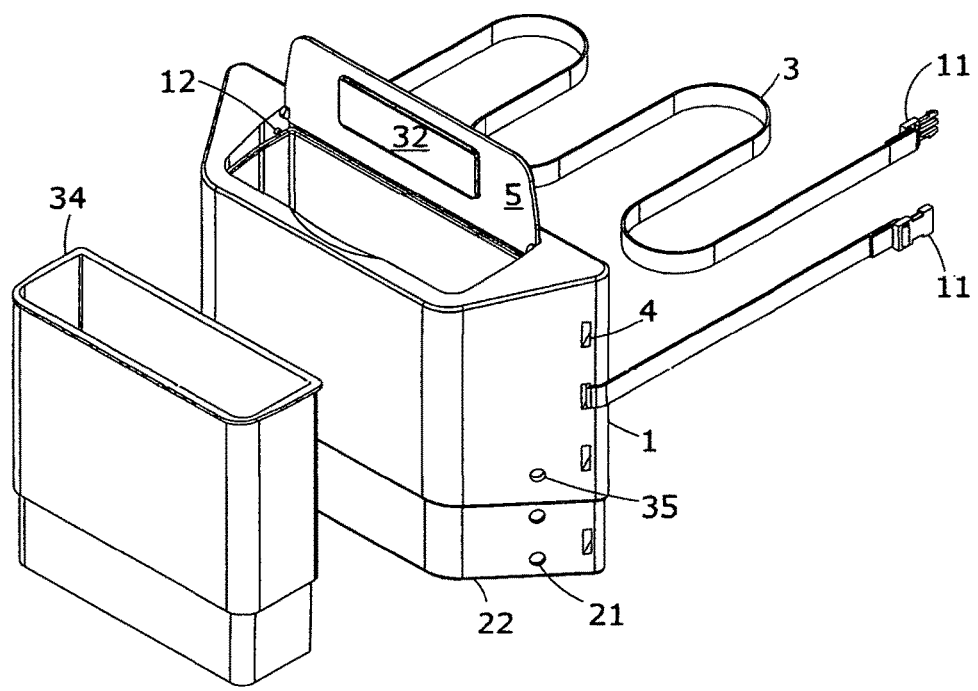
FIG. 3 shows a bird's-eye view of an embodiment including some characteristics of the first embodiment of the invention, including the outer container and the shell.

FIG. 3 shows a bird's-eye view of an embodiment including characteristics of the first embodiment of the invention, including the outer container and the shell. The lid is visible and open, and a regular liner can be seen. Screws (12) can be seen inside the embodiment. They help to keep the embodiment together. This embodiment also includes an adjustable liner (34) which is shown outside of the outer container. The adjustable liner's ability to be made shorter or taller can be discerned.

FIG. 4 shows a version of the second embodiment of the invention, with the "tilting shelf" (24) swung outward. This version of the invention also includes a trap door (32) in the lid on top of the outer container. A tilting shelf opening button (30) can be seen, on the outside of the tilting shelf. The tilting shelf opening button opens a clasp, which can be seen on the inside of the tilting shelf.

FIG. 5 shows a "cut-away" view of a version of the second embodiment, so that the user can see the tilting shelf, closed, and a regular liner inside the tilting shelf, and the liner ledges (25), which grip the regular liner. Therefore, the regular liner will tilt out of the embodiment with the tilting shelf when desired, and will also be below the lid, so that it will be able to receive items that are dropped through the lid. The tilting shelf is also held closed by a clasp here. This particular embodiment also includes a trap door (32) in the lid (5).

FIG. 6 shows a view of a version of the third embodiment, with the outer container and a shell. The gap between the walls of the shell can be seen, and the tilting shelf can open through this gap. The tilting shelf is closed.

FIG. 7 shows a back view of a version of the fourth embodiment of the invention, with external tabs, and with the strap threaded through some of the external tabs. The viewer can conclude that threading the strap through these external tabs (45) will probably be easier than threading it through the slots. The tabs are attached to the back panel (6).

FIG. 8 shows a version of a bird's eye version of the fifth embodiment of the invention, with a roll-top lid. The viewer can observe that the roll-top lid (26) is divided into multiple sections.

FIG. 9 shows a version of a cut-away version of the invention, with a roll-top lid. The viewer can see the runners that the roll-top lid rolls on. The viewer can also see that the fact that the roll-top lid is divided into multiple sections makes it easier for the roll-top lid to slide along the runners (31), and to open and close the roll-top lid.

FIG. 10 shows side view of a version of the sixth embodiment of the invention, with the outer container and lid composed of clear material. The lid is open. The user can see inside the outer container, and can see the regular liner therein. This particular embodiment includes a clip (9) to hold the embodiment to the seats in an automobile.

FIG. 11 shows a bird's-eye view of an embodiment including characteristics of the sixth embodiment of the invention, with a panel composed of clear material. The user can see the regular liner through this panel. The outer container can be attached to a seat in an automobile. This version of the embodiment also includes a light (14) on its top, and includes an elastic cord (17) as its method of attachment to the below-seat components.

FIG. 12 shows an embodiment including characteristics of the seventh embodiment of the invention, with a dispenser containing tissues on its side. This version of the embodiment also includes a light (14) on its top, and includes an elastic cord (17) as its method of attachment to the below-seat components. The elastic cord in this embodiment has two ends that can be tied together.

FIG. 13 shows an embodiment including characteristics of the eighth embodiment of the invention, with a holder ring (20) surrounding the outer container and a garbage bag inside the outer container. The edges of the garbage bag, are tucked inside the holder ring.

FIG. 14 shows a version of the ninth embodiment of the invention from above and to the side. The viewer can see the flexible outer container (8), and the zipper keeping the lid closed.

FIG. 15 shows a version of the ninth embodiment of the invention from directly above. The viewer can see the aperture in the lid, and a zipper that can open and close the aperture.

FIG. 16 shows a perspective view of an embodiment of the invention that includes a trap door (32) in the lid (5), which is a characteristic of the tenth embodiment. This version of the invention also includes an outer container and a shell, and allows the user to change the height of the embodiment by changing the height of the outer container, relative to the bottom of the shell.

FIG. 17 shows a cut-away view of a version of the twelfth embodiment of the invention. The viewer can see the spring (7) that controls the lid (5). This version of the twelfth embodiment also includes an adjustable liner, and a light on top of the outer container.

FIG. 18 shows a close-up view of one version of the adjustable liner. The viewer can see the raised portions of the inner and outer basins, which prevent the inner basin from moving beyond the raised portion of the outer basin, or the outer basin from moving beyond the raised portion of the inner basin.

FIG. 19 shows a cut-away view of a version of the outer container of the eleventh embodiment of the invention, containing another version of the adjustable liner. The viewer can see how a part of the upper section of the adjustable liner includes the small shelf that catches on the protruding portion of the rim of the outer container. The first ledges of the lower section can push upward against the second ledges of the upper section. This helps to increase the depth of the adjustable liner because the lower section cannot be pushed completely upwards into the upper section.

FIG. 20 shows a close-up view of another version of the adjustable liner (34), with knob holes (35) in the outer basin and sizing holes (21) in the inner basin. The viewer can see how the inner and outer basins can normally move up and down, relative to each other, and also how the sizing knob (28) that has been inserted through one of the knob holes (35) in the outer basin and sizing holes (21) in the inner basin, and how this sizing knob can prevent the inner and outer basins from moving up and down, relative to each other.

FIG. 21 shows a cut-away view of a version of the eleventh embodiment of the invention with a variation of the fourth version of the adjustable liner. One group of sizing shelves has been flipped outward from the inner basin of the adjustable liner, and is pushing against the top of the outer basin. This group of sizing shelves is preventing the outer basin of the adjustable liner from rising further.

FIG. 22 shows a cut-away view of a version of the twelfth embodiment of the invention. The user can see the lid (5).

FIG. 23 shows a view of an embodiment incorporating characteristics of the first and twelfth embodiments of the invention, viewed from the front and above.

FIG. 24 shows a cut-away view of a version of the eleventh embodiment of the invention, including a version of the adjustable liner that includes a first ledge, placed on the adjustable liner's lower section, and a second ledge, placed on the adjustable liner's upper section, where the second ledge is below the first section. The first ledge and second ledge form barriers that prevent the lower and upper sections from moving against each other more than a certain amount.

The invention claimed is:

1. An apparatus for receiving and storing trash, for occupants of vehicles, said apparatus comprising an outer container (1), a liner, a means of attachment of the outer container (1) to the below-seat components of a vehicle, and a lid (5); said apparatus further comprising that the means of attachment of the outer container to the below-seat components of the vehicle is one or more straps (3), each said strap including a buckle (11);

said outer container being hollow, oblong in shape, and having a front, a back, a top,
a bottom, a left side, and a right side,
said lid (5) being attached to said outer container and capable of opening or closing an aperture in said outer container; and said lid either partially or completely blocking said aperture when said lid is closed,
said liner being shaped in a manner that said liner can fit inside said outer container, below the top of said outer container and below said aperture, so that items which are dropped into said aperture will fall into said liner; said liner also being capable of being removed from said outer container when desired by the user; said liner having an opening on said liner's top, having walls on said liner's sides, and said liner having a bottom wall,
and said apparatus further comprising that said outer container includes at least one first means through which straps can be threaded on said outer container's left side, where said first means through which straps can be threaded are arranged in one or more vertical rows, and also a vertical row of at least one second means through which straps can be threaded on said outer container's right side, and also a vertical row of at least one third means through which straps can be threaded on the back of said outer container, and also a vertical row of at least one fourth means through which straps can be threaded on the back of said outer container;

where each said strap can be threaded through every said means through which straps can be threaded to attach said strap to said outer container (1), and where each said strap can then be used to attach said outer container (1) to said below-seat components by, while said strap is threaded through any of said means through which straps can be threaded;

said strap making one or more loops around said below-seat components, and the end of said strap that made said loops being threaded through one of said means through which straps can be threaded;

and where said buckle (11) can be manipulated to vary the size of said loops.

2. The apparatus of claim 1, further comprising that part of said top of said outer container next to said lid (5) is either raised and rounded, or lowered and rounded, so that users can more easily open said lid (5) by reaching their fingers into the rounded area and catching said lid (5).

3. The apparatus of claim 1, further comprising that the means through which straps can be threaded is slots (4), each said slot being an opening in said outer container sufficiently large for a strap to pass through said slot;

said apparatus further comprising that said first means includes at least one first vertical row of slots, said vertical row comprising at least two slots (4), where said first vertical row of slots is on said outer container's left side, close to the corner between the left side and the back of said outer container, said second means comprising a second vertical row of at least two slots on said outer container's right side, close to the corner between the right side and the back of said outer container, and also said third means comprising a third vertical row of at least two slots on the back of said outer container, close to the corner between the right side of said outer container and the back of said outer container, said fourth means further comprising a fourth vertical row of at least two slots on the back of said outer container, close to the corner between the left side of said outer container and the back of said outer container;

where each said strap can be threaded in through one of said slots and out of another of said slots to attach said strap to said outer container (1), and where said strap can then be used to attach said outer container (1) to said below-seat components by said strap making loops around said below-seat components, while said strap is threaded through two or more said slots;

and where said buckle (11) can be manipulated to vary the size of said loops to attach said strap to said outer container (1).

4. An apparatus for receiving and storing trash, for occupants of vehicles, said apparatus comprising an outer container (1), a liner, a means of attachment of the outer container (1) to the below-seat components of a vehicle, and a lid (5), a shell (22), and at least two sizing knobs (28), said outer container being hollow, oblong in shape, and having a front, a back, a top, a left side, and a right side, and a bottom, said lid (5) being attached to said outer container and capable of opening or closing an aperture in said outer container; and said lid either partially or completely blocking said aperture when said lid is closed, said liner being shaped in a manner that said liner can fit inside said outer container, below the top of said outer container and below said aperture, so that items which are dropped into said aperture will fall into said liner; said liner also being capable of being removed from said outer container when desired by the user; said liner having an opening on said liner's top, having walls on said liner's sides, and said liner having a bottom wall, said apparatus further comprising that part of said top of said outer container next to said lid (5) is either raised and rounded, or lowered and rounded, so that users can more easily open said lid (5) by reaching their fingers into the rounded area and catching said lid (5), said shell (22)

comprising a bottom and at least two vertical walls with a gap between said vertical walls, said shell further comprising at least one vertical row of sizing holes (21) in each said vertical wall; wherein each said sizing hole is wide enough for the narrowest part of a sizing knob to fit through said sizing hole, said outer container (1) further comprising at least two vertical rows of knob holes (35) on the walls of said outer container, wherein each said knob hole is wide enough for the narrowest part of a sizing knob to fit through said knob hole, said shell (22) further comprising that said outer container can fit around said shell's vertical walls;

said outer container further comprising that each vertical row of knob holes occupies a location within a wall of said outer container wherein, when said outer container is fitted around the vertical walls of said shell, a single sizing knob can penetrate one of the knob holes within said vertical row of knob holes, and also penetrate one of the sizing holes within said shell;

said apparatus further comprising that said sizing knobs possess sufficient strength that when each sizing knob is placed through a sizing hole and a knob hole, said sizing knobs support said outer container and prevent said outer container from sinking lower on said shell.

5. The apparatus of claim 4, further comprising that the means of attachment of the outer container to the below-seat components of the vehicle is one or more straps (3), each said strap including a buckle (11).

6. The apparatus of claim 4, further comprising that the means of attachment of the outer container to the below-seat components of the vehicle is one or more straps (3), each said strap including a buckle (11);

said apparatus further comprising slots (4), each said slot being an opening in said outer container sufficiently large for a strap to pass through said slot;

said slots comprising at least one first vertical row of slots, said first vertical row comprising at least two slots (4), where said first vertical row of slots is on said outer container's left side, close to the corner between the left side and the back of said outer container, said slots further comprising a second vertical row of at least two slots on said outer container's right side, close to the corner between the right side and the back of said outer container, and also a third vertical row of at least two slots on the back of said outer container, close to the corner between the right side of said outer container and the back of said outer container, said slots further comprising a fourth vertical row of at least two slots on the back of said outer container, close to the corner between the left side of said outer container and the back of said outer container;

where each said strap can be threaded in through one slot and out of another slot to attach said strap to said outer container (1), and where said strap can then be used to attach said outer container (1) to said below-seat components by said strap making loops around said below-seat components, while said strap is threaded through two or more said slots;

and where said buckle (11) can be manipulated to vary the size of said loops.

7. The apparatus of claim 4, wherein said sizing knobs (28) are plunger pins that are spring-loaded.

8. The apparatus of claim 4, further comprising feet on the bottom of said outer container.

9. The apparatus of claim 7, further comprising that the design of each plunger pin allows said plunger pin to be twisted simultaneously into a knob hole (35) and a sizing hole (21).

10. The apparatus of claim 4, further comprising that said liner is an adjustable liner (34); said adjustable liner (34) being shaped in a manner that said adjustable liner can fit inside said outer container, below the top of said outer container and below said aperture;

said adjustable liner also being capable of being removed from said outer container when desired by the user; said adjustable liner having an opening on said adjustable liner's top, said apparatus further comprising that said adjustable liner (34) includes at least two basins, and a means for calibrating the relative locations of said basins;

wherein said basins of said adjustable liner are designed so that a user may vary the distance between the top of one basin and the bottom of a second basin, while said basins remain directly connected;

and wherein the user may use the means for calibrating the relative location of said basins of said adjustable liner to fix the relative positions of all said basins, when desired by the user, or to limit the range of movement of all said basins, when desired by the user;

and wherein the user may manipulate the means for calibrating the relative location of said basins of said adjustable liner to allow a basin that is part of a group of basins with fixed relative positions to move, relative to the other basins in said group.

11. The apparatus of claim 4, further comprising one or more holder rings, wherein said outer container is divided into a bottom part and a top part, where the top part contains the lid and can be detached from the bottom part, and reattached to the bottom part, wherein said holder ring is a ring fitted around the bottom part of said outer container; and said holder ring can be moved to allow part of a plastic bag to be placed between said outer container and said holder ring while said holder ring is fitted around said outer container (1);

and said holder ring can then be placed in a position where said holder ring surrounds part of said bag and also surrounds part of said outer container (1) and holds part of said bag in contact with said outer container;

and where a plastic bag can be placed partially inside the bottom part of said outer container, with part of said plastic bag outside the bottom of said outer container, and then said top half placed on top of said bottom half of said outer container.

12. An apparatus for receiving and storing trash, for occupants of vehicles, said apparatus comprising an outer container (1), an adjustable liner (34), a means of attachment of the outer container (1) to the below-seat components of a vehicle, and a lid (5); said apparatus further comprising that the means of attachment of the outer container to the below-seat components of the vehicle is one or more straps (3), each said strap including a buckle (11);

said outer container being hollow, oblong in shape, and having a front, a back, a top, a bottom, a left side, and a right side, said lid (5) being attached to said outer container and capable of opening or closing an aperture in said outer container; and said lid either partially or completely blocking said aperture when said lid is closed, said adjustable liner (34) being shaped in a manner that said adjustable liner can fit inside said outer container, below the top of said outer container and below said aperture; said adjustable liner also being capable of being removed from said outer container when desired by the user;

said adjustable liner having an opening on said adjustable liner's top, said apparatus further comprising that said adjustable liner (34) includes at least two basins, and a means for calibrating the relative locations of said basins;

wherein said basins of said adjustable liner are designed so that a user may vary the distance between the top of one basin and the bottom of a second basin, while said basins remain directly connected;

and wherein the user may use the means for calibrating the relative location of said basins of said adjustable liner to fix the relative positions of all said basins, when desired by the user, or to limit the range of movement of all said basins, when desired by the user;

and wherein the user may manipulate the means for calibrating the relative location of said basins of said adjustable liner to allow a basin that is part of a group of basins with fixed relative positions to move, relative to the other basins in said group, and said apparatus further comprising that said outer container includes at least one first means through which straps can be threaded on said outer container's left side, where said first means through which straps can be threaded are arranged in one or more vertical rows, and also a vertical row of at least one second means through which straps can be threaded on said outer container's right side, and also a vertical row of at least one third means through which straps can be threaded on the back of said outer container, and also a vertical row of at least one fourth means through which straps can be threaded on the back of said outer container;

where each said strap can be threaded through every said means through which straps can be threaded to attach said strap to said outer container (1), and where each said strap can then be used to attach said outer container (1) to said below-seat components by, while said strap is threaded through any of said means through which straps can be threaded, said strap making one or more loops around said below-seat components, and the end of said strap that made said loops being threaded through one of said means through which straps can be threaded;

and where said buckle (11) can be manipulated to vary the size of said loops.

13. The apparatus of claim 12, further comprising that part of said top of said outer container next to said lid (5) is either raised and rounded, or lowered and rounded, so that users can more easily open said lid (5) by reaching their fingers into the rounded area and catching said lid (5).

14. The apparatus of claim 12, further comprising that either part or all of one or more of the following;
    a. said outer container,
    b. said lid,
    c. said adjustable liner
    is made out of clear material.

15. The apparatus of claim 12, further comprising one or more dispensers (38) located on the outside of said outer container.

16. The apparatus of claim 12, wherein the adjustable liner (34) comprises two basins, an outer basin and an inner basin, wherein the two basins each have the same number of walls, and wherein the inner basin and the outer basin each have an opening on its top, and the outer walls of the inner basin are in contact with the inner walls of the outer basin;
    said apparatus further comprising that, an area of the inner walls of the outer basin, where said area surrounds the inner walls of the outer basin, will bulge inward beyond the rest of the inner walls of the outer basin,
    said apparatus further comprising that an area of the outer walls of the inner basin, where said area surrounds the outer walls of the inner basin, will bulge outward beyond the rest of the inner walls of the outer basin,
    said apparatus further comprising that said outer basin and inner basin may slide against each other, but the bulged area of the outer wall of said inner basin is a physical barrier that prevents said outer basin from sliding over the bulged area of the outer wall of said inner basin, and the bulged area of the inner wall of said outer basin is a physical barrier that prevents said inner basin from sliding over the bulged area of said inner wall of said outer basin.

17. The apparatus of claim 12 further comprising that the uppermost basin of said adjustable liner includes a basin top that projects horizontally outward from said basin, said apparatus further comprising that a rim of said aperture is shaped to allow said basin top to rest upon part or all of the rim of said aperture without disturbing the operation of said lid, said apparatus further comprising that said basin top is sufficiently strong to rest upon part or all of the rim of said aperture, and to support all of said adjustable liner (34) while resting upon part or all of the rim of said aperture.

18. An apparatus for receiving and storing trash, for occupants of vehicles, said apparatus comprising an outer container (1), an adjustable liner (34), a lid (5) and a means of attachment of the outer container (1) to the below-seat components of a vehicle, a shell (22), and at least two sizing knobs (28),
    said outer container being hollow, oblong in shape, and having a front, a back, a top,
    a bottom, a left side, and a right side,
    said lid (5) being attached to said outer container and capable of opening or closing an aperture in said outer container; and said lid either partially or completely blocking said aperture when said lid is closed,
    said adjustable liner being shaped in a manner that said adjustable liner can fit inside said outer container, below the top of said outer container and below said aperture, so that items which are dropped into said aperture will fall into said adjustable liner; said adjustable liner also being capable of being removed from said outer container when desired by the user; said adjustable liner having an opening on said adjustable liner's top, having walls on said adjustable liner's sides, and said adjustable liner having a bottom wall,
    said apparatus further comprising that said outer container is divided into two parts, an upper part, and a lower part, which can be attached to each other, but where the upper part of the outer container can be removed from the lower part of the outer container and said adjustable liner removed from said outer container through the opening in said outer container created when said upper part of the outer container can be removed from the lower part of the outer container,
    said shell (22) comprising a bottom and at least two vertical walls with a gap between said vertical walls,
    said shell further comprising at least one vertical row of sizing holes (21) in each said vertical wall; wherein each said sizing hole is wide enough for the narrowest part of a sizing knob to fit through said sizing hole,
    said outer container (1) further comprising at least two vertical rows of knob holes (35) on the walls of said outer container, wherein each said knob hole is wide enough for the narrowest part of a sizing knob to fit through said knob hole,
    said shell (22) further comprising that said outer container can fit around said shell's vertical walls;
    said outer container further comprising that each vertical row of knob holes occupies a location within a wall of said outer container wherein, when said outer container is fitted around the vertical walls of said shell, a single sizing knob can penetrate one of the knob holes within said vertical row of knob holes, and also penetrate one of the sizing holes within said shell;
    said apparatus further comprising that said sizing knobs possess sufficient strength that when each sizing knob is placed through a sizing hole and a knob hole, said sizing knobs support said outer container and prevent said outer container from sinking lower on said shell.

19. An apparatus for receiving and storing trash, for occupants of vehicles, said apparatus comprising an outer container (1), a liner, a means of attachment of the outer container (1) to the below-seat components of a vehicle, and a lid (5) and a trap door (32);
    said outer container being hollow, oblong in shape, and having a front, a back, a top,
    a bottom, a left side, and a right side,
    said apparatus further comprising that the means of attachment of the outer container to the below-seat components of the vehicle is one or more straps (3), each said strap including a buckle (11);
    said lid (5) being attached to said outer container and capable of opening or closing an aperture in said outer container; and said lid either partially or completely blocking said aperture when said lid is closed,
    said liner being shaped in a manner that said liner can fit inside said outer container, below the top of said outer container and below said aperture, so that items which are dropped into said aperture will fall into said liner; said liner also being capable of being removed from said outer container when desired by the user; said liner having an opening on said liner's top, having walls on said liner's sides, and said liner having a bottom wall, said apparatus further comprising that part of said top of said outer container next to said lid (5) is either raised and rounded, or lowered and rounded, so that users can more easily open said lid (5) by reaching their fingers into the rounded area and catching said lid (5);

said apparatus further comprising that said trap door is attached to said lid, and is capable of being opened or closed, and, when closed, is capable of either fully or partially blocking a hole in said lid, where objects that fall through said hole in said lid fall into the interior of said outer container (1);

and said apparatus further comprising that said outer container includes at least one first means through which straps can be threaded on said outer container's left side, where said first means through which straps can be threaded are arranged in one or more vertical rows, and also a vertical row of at least one second means through which straps can be threaded on said outer container's right side, and also a vertical row of at least one third means through which straps can be threaded on the back of said outer container, and also a vertical row of at least one fourth means through which straps can be threaded on the back of said outer container;

where each said strap can be threaded through every said means through which straps can be threaded to attach said strap to said outer container (1), and where each said strap can then be used to attach said outer container (1) to said below-seat components by, while said strap is threaded through any of said means through which straps can be threaded, said strap making one or more loops around said below-seat components, and the end of said strap that made said loops being threaded through one of said means through which straps can be threaded;

and where said buckle (11) can be manipulated to vary the size of said loops.

20. An apparatus for receiving and storing trash, for occupants of vehicles, said apparatus comprising an outer container (1), an adjustable liner (34), a means of attachment of the outer container (1) to the below-seat components of a vehicle, and a lid (5), a shell (22), and at least two sizing knobs (28), wherein said lid (5) is attached to said outer container and is capable of opening or closing an aperture in said outer container; and said lid either partially or completely blocks said aperture when said lid is closed, wherein said adjustable liner is shaped in a manner that said adjustable liner can fit inside said outer container, below the top of said outer container and below said aperture, so that items which are dropped into said aperture will fall into said adjustable liner; said adjustable liner also being capable of being removed from said outer container when desired by the user; said adjustable liner having an opening on said adjustable liner's top, having walls on said adjustable liner's sides, and said adjustable liner having a bottom wall;

said shell (22) comprising a bottom and at least two vertical walls with a gap between said vertical walls, said shell further comprising at least one vertical row of sizing holes (21) in each said vertical wall; wherein each said sizing hole is wide enough for the narrowest part of a sizing knob to fit through said sizing hole, said outer container (1) further comprising at least two vertical rows of knob holes (35) on the walls of said outer container, wherein each said knob hole is wide enough for the narrowest part of a sizing knob to fit through said knob hole, said shell (22) further comprising that said outer container can fit around said shell's vertical walls;

said outer container further comprising that each vertical row of knob holes occupies a location within a wall of said outer container wherein, when said outer container is fitted around the vertical walls of said shell, a single sizing knob can penetrate one of the knob holes within said vertical row of knob holes, and also penetrate one of the sizing holes within said shell;

said apparatus further comprising that said sizing knobs possess sufficient strength that when each sizing knob is placed through a sizing hole and a knob hole, said sizing knobs support said outer container and prevent said outer container from sinking lower on said shell;

said apparatus further comprising at least one dispenser (38) located on the outside of said outer container or said shell.

21. An apparatus for receiving and storing trash, for occupants of vehicles, said apparatus comprising an outer container (1), a liner, a means of attachment of the outer container (1) to the below-seat components of a vehicle, and a lid (5), a shell (22), and at least two sizing knobs (28), said shell comprising a bottom and vertical walls, and an open top, said outer container being hollow, oblong in shape, and having a front, a back, a top, a left side, and a right side, said lid (5) being attached to said outer container and capable of opening or closing an aperture in said outer container; and said lid either partially or completely blocking said aperture when said lid is closed, said liner being shaped in a manner that said liner can fit inside said outer container, below the top of said outer container and below said aperture, so that items which are dropped into said aperture will fall into said liner; said liner also being capable of being removed from said outer container when desired by the user; said liner having an opening on said liner's top, having walls on said liner's sides, and said liner having a bottom wall, said apparatus further comprising that part of said top of said outer container next to said lid (5) is either raised and rounded, or lowered and rounded, so that users can more easily open said lid (5) by reaching their fingers into the rounded area and catching said lid (5);

said shell further comprising that the open top of said shell is sufficiently large that said outer container (1) can fit through said opening;

said shell further comprising at least two vertical row of sizing holes (21) in said vertical walls of said shell; wherein each said sizing hole is wide enough for the narrowest part of a sizing knob to fit through said sizing hole, said outer container (1) further comprising at least two vertical rows of knob holes (35) on the walls of said outer container, wherein each said knob hole is wide enough for the narrowest part of a sizing knob to fit through said knob hole, and wherein each knob hole in said outer container is placed in a position on the wall of said outer container where a single sizing knob can penetrate said knob hole, and also penetrate one of the sizing holes in said shell, said apparatus further comprising that said sizing knobs possess sufficient strength that when each sizing knob is placed through a sizing hole and a knob hole, said sizing knobs support said outer container and prevent said outer container from sinking lower in said shell.

22. An apparatus for receiving and storing trash, for occupants of vehicles, said apparatus comprising an outer container (1), an adjustable liner, a shell (22), and at least two sizing knobs (28), a means of attachment of the outer container (1) to the below-seat components of a vehicle, and a lid (5); said apparatus further comprising that the means of attachment of the outer container to the below-seat components of the vehicle is one or more straps (3), each said strap including a buckle (11);

said outer container being hollow, oblong in shape, and having a front, a back, a top, a bottom, a left side, and a right side, said lid (5) being attached to said outer container and capable of opening or closing an aperture in said outer container; and said lid either partially or completely blocking said aperture when said lid is closed, said adjustable liner being shaped in a manner that said liner can fit inside said outer container, below the top of said outer container and below said aperture; said adjustable liner also being capable of being removed from said outer container when desired by the user; said adjustable liner having an opening on said liner's top, said apparatus further comprising that said adjustable liner (34) includes at least two basins, and a means for calibrating the relative locations of said basins;

wherein said basins of said adjustable liner are designed so that a user may vary the distance between the top of one basin and the bottom of a second basin, while said basins remain directly connected;

and wherein the user may use the means for calibrating the relative location of said basins of said adjustable liner to fix the relative positions of all said basins, when desired by the user, or to limit the range of movement of all said basins, when desired by the user;

and wherein the user may manipulate the means for calibrating the relative location of said basins of said adjustable liner to allow a basin that is part of a group of basins with fixed relative positions to move, relative to the other basins in said group;

said shell (22) comprising a bottom and at least two vertical walls with a gap between said vertical walls, said shell further comprising at least one vertical row of sizing holes (21) in each said vertical wall; wherein each said sizing hole is wide enough for the narrowest part of a sizing knob to fit through said sizing hole, said outer container (1) further comprising at least two vertical rows of knob holes (35) on the walls of said outer container, wherein each said knob hole is wide enough for the narrowest part of a sizing knob to fit through said knob hole, said shell (22) further comprising that said outer container can fit around said shell's vertical walls;

said outer container further comprising that each vertical row of knob holes occupies a location within a wall of said outer container wherein, when said outer container is fitted around the vertical walls of said shell, a single sizing knob can penetrate one of the knob holes within said vertical row of knob holes, and also penetrate one of the sizing holes within said shell;

said apparatus further comprising that said sizing knobs possess sufficient strength that when each sizing knob is placed through a sizing hole and a knob hole, said sizing knobs support said outer container and prevent said outer container from sinking lower on said shell.

\* \* \* \* \*